(12) United States Patent
Kuzmin et al.

(10) Patent No.: US 12,093,533 B1
(45) Date of Patent: *Sep. 17, 2024

(54) MEMORY MANAGEMENT OF NONVOLATILE DISCRETE NAMESPACES

(71) Applicant: Radian Memory Systems, LLC, New York, NY (US)

(72) Inventors: Andrey V. Kuzmin, Moscow (RU); Alan Chen, Simi Valley, CA (US); Robert Lercari, Thousand Oaks, CA (US)

(73) Assignee: Radian Memory Systems, Inc., Manhattan Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,257

(22) Filed: Jul. 5, 2023

Related U.S. Application Data

(63) Continuation of application No. 17/568,891, filed on Jan. 5, 2022, now Pat. No. 11,740,801, which is a
(Continued)

(51) Int. Cl.
*G06F 3/06* (2006.01)
*G06F 12/02* (2006.01)

(52) U.S. Cl.
CPC .......... *G06F 3/0616* (2013.01); *G06F 3/0647* (2013.01); *G06F 3/0679* (2013.01);
(Continued)

(58) Field of Classification Search
CPC .... G06F 3/0616; G06F 3/0647; G06F 3/0679; G06F 12/0246; G06F 2212/7205; G06F 2212/7211
(Continued)

(56) References Cited

U.S. PATENT DOCUMENTS 4,532,590 A 7/1985 Wallach
4,813,002 A 3/1989 Joyce
(Continued)

FOREIGN PATENT DOCUMENTS

JP 2001051889 A 2/2001
JP 2011123863 A 6/2011
(Continued)

OTHER PUBLICATIONS

RD527033, A, Mar. 10, 2008.
(Continued)

*Primary Examiner* — David Yi
*Assistant Examiner* — Zubair Ahmed
(74) *Attorney, Agent, or Firm* — Marc P. Schuyler

(57) ABSTRACT

This disclosure provides techniques for managing memory which match per-data metrics to those of other data or to memory destination. In one embodiment, wear data is tracked for at least one tier of nonvolatile memory (e.g., flash memory) and a measure of data persistence (e.g., age, write frequency, etc.) is generated or tracked for each data item. Memory wear management based on these individually-generated or tracked metrics is enhanced by storing or migrating data in a manner where persistent data is stored in relatively worn memory locations (e.g., relatively more-worn flash memory) while temporary data is stored in memory that is less worn or is less susceptible to wear. Other data placement or migration techniques are also disclosed.

26 Claims, 9 Drawing Sheets

Related U.S. Application Data continuation of application No. 16/832,793, filed on Mar. 27, 2020, now Pat. No. 11,249,652, which is a continuation of application No. 14/848,273, filed on Sep. 8, 2015, now Pat. No. 10,642,505, which is a continuation-in-part of application No. 14/047,193, filed on Oct. 7, 2013, now Pat. No. 9,229,854, which is a continuation-in-part of application No. 13/767,723, filed on Feb. 14, 2013, now Pat. No. 9,652,376.

(60) Provisional application No. 62/063,357, filed on Oct. 13, 2014, provisional application No. 62/048,162, filed on Sep. 9, 2014, provisional application No. 61/757,464, filed on Jan. 28, 2013.

(52) U.S. Cl.
CPC .. *G06F 12/0246* (2013.01); *G06F 2212/7205* (2013.01); *G06F 2212/7211* (2013.01)

(58) Field of Classification Search
USPC .................................................. 711/103, 102
See application file for complete search history.

(56) References Cited

U.S. PATENT DOCUMENTS

| | | |
|---|---|---|
| 5,404,485 A | 4/1995 | Ban |
| 5,568,423 A | 10/1996 | Jou et al. |
| 5,652,857 A | 7/1997 | Shimoi et al. |
| 5,860,082 A | 1/1999 | Smith et al. |
| 5,963,977 A | 10/1999 | Gold |
| 6,118,724 A | 9/2000 | Higgenbottom |
| 6,134,631 A | 10/2000 | Jennings, III |
| 6,145,069 A | 11/2000 | Dye |
| 6,148,354 A | 11/2000 | Ban |
| 6,381,668 B1 | 4/2002 | Lunteren |
| 6,430,650 B1 | 8/2002 | Miyauchi |
| 6,571,312 B1 | 5/2003 | Sugai |
| 6,892,287 B1 | 5/2005 | Millard |
| 7,096,378 B2 | 8/2006 | Stence et al. |
| 7,120,729 B2 | 10/2006 | Gonzalez |
| 7,339,823 B2 | 3/2008 | Nakayama et al. |
| 7,383,375 B2 | 6/2008 | Sinclair |
| 7,404,031 B2 | 7/2008 | Oshima |
| 7,406,563 B1 | 7/2008 | Nagshain |
| 7,519,869 B2 | 4/2009 | Mizuno |
| 7,552,272 B2 | 6/2009 | Gonzalez |
| 7,555,628 B2 | 6/2009 | Bennett |
| 7,581,078 B2 | 8/2009 | Ware |
| 7,631,138 B2 | 12/2009 | Gonzalez |
| 7,702,846 B2 | 4/2010 | Nakanishi et al. |
| 7,702,948 B1 | 4/2010 | Kalman |
| 7,710,777 B1 | 5/2010 | Mintierth |
| 7,747,813 B2 | 6/2010 | Danilak |
| 7,752,381 B2 | 7/2010 | Wong |
| 7,801,561 B2 | 9/2010 | Parikh et al. |
| 7,809,900 B2 | 10/2010 | Danilak |
| 7,814,262 B2 | 10/2010 | Sinclair |
| 7,818,489 B2 | 10/2010 | Karamcheti et al. |
| 7,836,244 B2 | 11/2010 | Kim et al. |
| 7,861,122 B2 | 12/2010 | Cornwell et al. |
| 7,877,540 B2 | 1/2011 | Sinclair |
| 7,904,619 B2 | 3/2011 | Danilak |
| 7,934,074 B2 | 4/2011 | Lee |
| 7,941,692 B2 | 5/2011 | Royer et al. |
| 7,970,983 B2 | 6/2011 | Nochimowski |
| 7,991,944 B2 | 8/2011 | Lee et al. |
| 8,001,318 B1 | 8/2011 | Iyer |
| 8,024,545 B2 | 9/2011 | Kim et al. |
| 8,046,524 B2 | 10/2011 | Tringali |
| 8,055,833 B2 | 11/2011 | Danilak et al. |
| 8,065,471 B2 | 11/2011 | Yano et al. |
| 8,065,473 B2 | 11/2011 | Ito et al. |
| 8,068,365 B2 | 11/2011 | Kim |
| 8,069,284 B2 | 11/2011 | Oh |
| 8,072,463 B1 | 12/2011 | Van Dyke |
| 8,074,022 B2 | 12/2011 | Okin et al. |
| 8,082,389 B2 | 12/2011 | Fujibayashi |
| 8,086,790 B2 | 12/2011 | Roohparvar |
| 8,099,581 B2 | 1/2012 | Bennett |
| 8,099,632 B2 | 1/2012 | Tringali |
| 8,195,912 B2 | 6/2012 | Flynn |
| 8,219,776 B2 | 7/2012 | Forhan |
| 8,285,918 B2 | 10/2012 | Maheshwari |
| 8,291,151 B2 | 10/2012 | Sinclair |
| 8,291,295 B2 | 10/2012 | Harari |
| 8,341,339 B1 | 12/2012 | Boyle |
| 8,347,042 B2 | 1/2013 | You |
| 8,402,249 B1 | 3/2013 | Zhu |
| 8,423,710 B1 | 4/2013 | Gole |
| 8,495,280 B2 | 7/2013 | Kang |
| 8,539,197 B1 | 9/2013 | Marshall |
| 8,572,331 B2 | 10/2013 | Shalvi |
| 8,601,202 B1 | 12/2013 | Melcher |
| 8,645,634 B1 | 2/2014 | Cox et al. |
| 8,668,894 B2 | 4/2014 | Kuehne |
| 8,700,961 B2 | 4/2014 | Lassa |
| 8,954,708 B2 | 2/2015 | Kim |
| 8,959,307 B1 | 2/2015 | Bruce |
| 8,996,796 B1 | 3/2015 | Karamcheti |
| 9,063,844 B2 | 6/2015 | Higgins |
| 9,123,443 B2 | 9/2015 | Chung |
| 9,176,864 B2 | 11/2015 | Gorobets |
| 9,229,854 B1 | 1/2016 | Kuzmin et al. |
| 9,286,198 B2 | 3/2016 | Bennett |
| 9,329,986 B2 | 5/2016 | Li |
| 9,335,939 B2 | 5/2016 | Bennett et al. |
| 9,348,749 B2 | 5/2016 | Choi |
| 9,378,149 B1 | 6/2016 | Bonwick |
| 9,400,749 B1 | 7/2016 | Kuzmin et al. |
| 9,405,621 B2 | 8/2016 | Yu |
| 9,519,578 B1 | 12/2016 | Kuzmin et al. |
| 9,542,118 B1 | 1/2017 | Lercari et al. |
| 9,565,269 B2 | 2/2017 | Malwankar |
| 9,575,672 B2 | 2/2017 | Yamamoto |
| 9,588,904 B1 | 3/2017 | Lercari et al. |
| 9,652,376 B2 | 5/2017 | Kuzmin et al. |
| 9,696,917 B1 | 7/2017 | Sareena et al. |
| 9,710,377 B1 | 7/2017 | Kuzmin et al. |
| 9,727,454 B2 | 8/2017 | Kuzmin et al. |
| 9,734,086 B2 | 8/2017 | Flynn |
| 9,785,572 B1 | 10/2017 | Lercari et al. |
| 9,846,541 B2 | 12/2017 | Miyamoto et al. |
| 9,858,008 B2 | 1/2018 | Liu |
| 10,067,866 B2 | 9/2018 | Sutardja |
| 10,445,229 B1 | 10/2019 | Kuzmin et al. |
| 10,552,058 B1 | 2/2020 | Jadon et al. |
| 10,552,085 B1 | 2/2020 | Chen et al. |
| 10,642,505 B1 | 5/2020 | Kuzmin |
| 10,642,748 B1 | 5/2020 | Lercari |
| 10,838,853 B1 | 11/2020 | Kuzmin |
| 10,884,915 B1 | 1/2021 | Kuzmin |
| 10,915,458 B1 | 2/2021 | Lercari |
| 10,956,082 B1 | 3/2021 | Kuzmin |
| 10,977,188 B1 | 4/2021 | Lercari |
| 10,983,907 B1 | 4/2021 | Kuzmin |
| 10,996,863 B1 | 5/2021 | Kuzmin |
| 11,003,586 B1 | 5/2021 | Lercari |
| 11,023,315 B1 | 6/2021 | Jadon |
| 11,023,386 B1 | 6/2021 | Lercari |
| 11,023,387 B1 | 6/2021 | Lercari |
| 11,048,643 B1 | 6/2021 | Lercari |
| 11,068,408 B2 | 7/2021 | Kim |
| 11,074,175 B1 | 7/2021 | Kuzmin |
| 11,080,181 B1 | 8/2021 | Kuzmin |
| 11,086,789 B1 | 8/2021 | Lercari |
| 11,100,006 B1 | 8/2021 | Lercari |
| 11,175,984 B1 | 11/2021 | Lercari |
| 11,188,457 B1 | 11/2021 | Kuzmin |
| 11,216,365 B1 | 1/2022 | Kuzmin |
| 11,221,959 B1 | 1/2022 | Lercari |
| 11,221,960 B1 | 1/2022 | Lercari |
| 11,221,961 B1 | 1/2022 | Lercari |

(56) References Cited

U.S. PATENT DOCUMENTS

| | | | |
|---|---|---|---|
| 11,487,678 | B2 | 11/2022 | Park |
| 11,500,766 | B2 | 11/2022 | Bueb |
| 11,580,030 | B2 | 2/2023 | Das |
| 11,675,708 | B1 | 6/2023 | Lercari |
| 11,704,237 | B1 | 7/2023 | Kuzmin |
| 2003/0028733 | A1 | 2/2003 | Tsunoda et al. |
| 2003/0037071 | A1 | 2/2003 | Harris |
| 2003/0065866 | A1 | 4/2003 | Spencer |
| 2003/0188032 | A1 | 10/2003 | Solomon |
| 2004/0083335 | A1 | 4/2004 | Gonzalez |
| 2005/0073844 | A1 | 4/2005 | Gonzalez |
| 2005/0073884 | A1 | 4/2005 | Gonzalez |
| 2005/0144358 | A1* | 6/2005 | Conley .............. G06F 12/0246 711/E12.008 |
| 2005/0144413 | A1 | 6/2005 | Kuo |
| 2006/0004957 | A1 | 1/2006 | Hand, III |
| 2006/0022171 | A1 | 10/2006 | Maeda et al. |
| 2007/0019481 | A1 | 1/2007 | Park |
| 2007/0046681 | A1 | 3/2007 | Nagashima |
| 2007/0058431 | A1 | 3/2007 | Chung et al. |
| 2007/0091497 | A1 | 4/2007 | Mizuno |
| 2007/0143569 | A1 | 6/2007 | Sanders |
| 2007/0168321 | A1 | 7/2007 | Saito |
| 2007/0233939 | A1 | 10/2007 | Kim |
| 2007/0260811 | A1 | 11/2007 | Merry, Jr. et al. |
| 2007/0260841 | A1 | 11/2007 | Hampel |
| 2007/0283428 | A1 | 12/2007 | Ma et al. |
| 2008/0005502 | A1 | 1/2008 | Kanai |
| 2008/0034153 | A1 | 2/2008 | Lee |
| 2008/0082596 | A1 | 4/2008 | Gorobets |
| 2008/0126720 | A1 | 5/2008 | Danilak |
| 2008/0126724 | A1 | 5/2008 | Danilak |
| 2008/0147964 | A1 | 6/2008 | Chow |
| 2008/0155204 | A1 | 6/2008 | Qawami et al. |
| 2008/0189485 | A1 | 8/2008 | Jung et al. |
| 2008/0195833 | A1 | 8/2008 | Park |
| 2008/0201517 | A1 | 8/2008 | Kuhne |
| 2008/0209114 | A1 | 8/2008 | Chow |
| 2008/0307192 | A1 | 12/2008 | Sinclair |
| 2008/0320476 | A1 | 12/2008 | Wingard |
| 2009/0036163 | A1 | 2/2009 | Kimbrell |
| 2009/0044190 | A1 | 2/2009 | Tringali |
| 2009/0046533 | A1 | 2/2009 | Jo |
| 2009/0083478 | A1 | 3/2009 | Kunimatsu |
| 2009/0089482 | A1 | 4/2009 | Traister |
| 2009/0089490 | A1 | 4/2009 | Ozawa et al. |
| 2009/0119529 | A1 | 5/2009 | Kono |
| 2009/0138671 | A1 | 5/2009 | Danilak |
| 2009/0172219 | A1 | 7/2009 | Mardiks |
| 2009/0172246 | A1 | 7/2009 | Afriat |
| 2009/0172250 | A1 | 7/2009 | Allen et al. |
| 2009/0172257 | A1 | 7/2009 | Prins |
| 2009/0172499 | A1 | 7/2009 | Olbrich |
| 2009/0182964 | A1 | 7/2009 | Greiner |
| 2009/0198946 | A1 | 8/2009 | Ebata |
| 2009/0210616 | A1 | 8/2009 | Karamcheti |
| 2009/0210636 | A1 | 8/2009 | Karamcheti |
| 2009/0240903 | A1 | 9/2009 | Sauber |
| 2009/0254689 | A1 | 10/2009 | Karamcheti |
| 2009/0254705 | A1 | 10/2009 | Abali et al. |
| 2009/0271562 | A1 | 10/2009 | Sinclair |
| 2009/0292839 | A1 | 11/2009 | Oh |
| 2009/0300015 | A1 | 12/2009 | Kazan et al. |
| 2009/0327602 | A1 | 12/2009 | Moore et al. |
| 2010/0011085 | A1 | 1/2010 | Taguchi |
| 2010/0011186 | A1 | 1/2010 | Bennett |
| 2010/0191779 | A1 | 1/2010 | Hinrichs |
| 2010/0030946 | A1 | 2/2010 | Kano |
| 2010/0042655 | A1 | 2/2010 | Tse et al. |
| 2010/0083050 | A1 | 4/2010 | Ohyama |
| 2010/0106734 | A1 | 4/2010 | Calder |
| 2010/0115172 | A1 | 5/2010 | Gillingham et al. |
| 2010/0125702 | A1 | 5/2010 | Lee |
| 2010/0161882 | A1 | 6/2010 | Stern et al. |
| 2010/0162012 | A1 | 6/2010 | Cornwell et al. |
| 2010/0182838 | A1 | 7/2010 | Kim et al. |
| 2010/0199065 | A1 | 8/2010 | Kaneda |
| 2010/0211737 | A1 | 8/2010 | Flynn |
| 2010/0241866 | A1 | 9/2010 | Rodorff |
| 2010/0262761 | A1 | 10/2010 | Borchers et al. |
| 2010/0262762 | A1 | 10/2010 | Borchers |
| 2010/0262765 | A1 | 10/2010 | Cheon |
| 2010/0262773 | A1 | 10/2010 | Borchers |
| 2010/0281230 | A1 | 11/2010 | Rabii et al. |
| 2010/0287217 | A1 | 11/2010 | Borchers et al. |
| 2010/0287327 | A1 | 11/2010 | Li |
| 2010/0287332 | A1 | 11/2010 | Koshiyama |
| 2010/0299494 | A1 | 11/2010 | Van Acht |
| 2010/0329011 | A1 | 12/2010 | Lee et al. |
| 2011/0033548 | A1 | 2/2011 | Kimmel et al. |
| 2011/0041039 | A1 | 2/2011 | Harari |
| 2011/0055445 | A1 | 3/2011 | Gee et al. |
| 2011/0066792 | A1 | 3/2011 | Shaeffer |
| 2011/0125956 | A1 | 5/2011 | Danilak |
| 2011/0138114 | A1 | 6/2011 | Yen |
| 2011/0153911 | A1 | 6/2011 | Sprouse |
| 2011/0153917 | A1 | 6/2011 | Maita |
| 2011/0161784 | A1 | 6/2011 | Sellinger et al. |
| 2011/0167199 | A1 | 7/2011 | Danilak |
| 2011/0197014 | A1 | 8/2011 | Yeh |
| 2011/0197023 | A1 | 8/2011 | Iwamitsu et al. |
| 2011/0231623 | A1 | 9/2011 | Goss |
| 2011/0238890 | A1 | 9/2011 | Sukegawa |
| 2011/0238892 | A1 | 9/2011 | Tsai |
| 2011/0238943 | A1 | 9/2011 | Devendran et al. |
| 2011/0264843 | A1 | 10/2011 | Haines |
| 2011/0276756 | A1 | 11/2011 | Bish et al. |
| 2011/0283043 | A1 | 11/2011 | Schuette |
| 2011/0296089 | A1 | 12/2011 | Seol |
| 2011/0296133 | A1 | 12/2011 | Flynn et al. |
| 2011/0314209 | A1 | 12/2011 | Eckstein |
| 2012/0033519 | A1 | 2/2012 | Confalonieri et al. |
| 2012/0054419 | A1 | 3/2012 | Chen |
| 2012/0059972 | A1 | 3/2012 | Chen |
| 2012/0066441 | A1 | 3/2012 | Weingarten |
| 2012/0079174 | A1 | 3/2012 | Nellans |
| 2012/0131270 | A1 | 5/2012 | Hemmi |
| 2012/0131381 | A1 | 5/2012 | Eleftheriou |
| 2012/0155492 | A1 | 6/2012 | Abel |
| 2012/0159039 | A1 | 6/2012 | Kegel et al. |
| 2012/0191921 | A1 | 7/2012 | Shaeffer |
| 2012/0198128 | A1 | 8/2012 | Van Aken |
| 2012/0198129 | A1 | 8/2012 | Van Aken |
| 2012/0204079 | A1 | 8/2012 | Takefman et al. |
| 2012/0221776 | A1 | 8/2012 | Yoshihashi |
| 2012/0246394 | A1 | 9/2012 | Ou |
| 2012/0303875 | A1 | 11/2012 | Benhase |
| 2013/0007343 | A1 | 1/2013 | Rub |
| 2013/0013852 | A1 | 1/2013 | Hou et al. |
| 2013/0019062 | A1 | 1/2013 | Bennett et al. |
| 2013/0024460 | A1 | 1/2013 | Peterson |
| 2013/0073793 | A1 | 3/2013 | Yamagishi |
| 2013/0073816 | A1 | 3/2013 | Seo et al. |
| 2013/0097236 | A1 | 4/2013 | Khorashadi |
| 2013/0111295 | A1 | 5/2013 | Li et al. |
| 2013/0111298 | A1 | 5/2013 | Seroff |
| 2013/0124793 | A1 | 5/2013 | Gyl et al. |
| 2013/0138868 | A1 | 5/2013 | Seroff |
| 2013/0145111 | A1 | 6/2013 | Murukani |
| 2013/0166824 | A1 | 6/2013 | Shim |
| 2013/0166825 | A1 | 6/2013 | Kim et al. |
| 2013/0227201 | A1 | 8/2013 | Talagala |
| 2013/0232297 | A1 | 9/2013 | Tanaka |
| 2013/0242425 | A1 | 9/2013 | Zayas et al. |
| 2013/0282055 | A1 | 10/2013 | Parker |
| 2013/0290619 | A1 | 10/2013 | Knight |
| 2013/0297852 | A1 | 11/2013 | Fai et al. |
| 2013/0326117 | A1 | 12/2013 | Aune |
| 2013/0332656 | A1 | 12/2013 | Kandiraju |
| 2013/0339580 | A1 | 12/2013 | Brandt |
| 2014/0040550 | A1 | 2/2014 | Nale |
| 2014/0047210 | A1 | 2/2014 | Cohen |
| 2014/0047300 | A1 | 2/2014 | Liang |
| 2014/0101371 | A1 | 4/2014 | Nguyen et al. |

(56) References Cited

U.S. PATENT DOCUMENTS

| | | |
|---|---|---|
| 2014/0122781 A1 | 5/2014 | Smith et al. |
| 2014/0189207 A1 | 7/2014 | Sinclair |
| 2014/0189209 A1 | 7/2014 | Sinclair et al. |
| 2014/0195725 A1 | 7/2014 | Bennett |
| 2014/0208004 A1 | 7/2014 | Cohen |
| 2014/0208062 A1 | 7/2014 | Cohen |
| 2014/0215129 A1 | 7/2014 | Kuzmin et al. |
| 2014/0237168 A1 | 8/2014 | Prins |
| 2014/0297949 A1 | 10/2014 | Nagawaka |
| 2014/0317346 A1 | 10/2014 | Moon |
| 2015/0046670 A1 | 2/2015 | Kim |
| 2015/0067297 A1 | 3/2015 | Arroyo et al. |
| 2015/0113203 A1 | 4/2015 | Dancho et al. |
| 2015/0134930 A1 | 5/2015 | Huang et al. |
| 2015/0149789 A1 | 5/2015 | Seo et al. |
| 2015/0212938 A1 | 6/2015 | Chen et al. |
| 2015/0193148 A1 | 7/2015 | Miwa et al. |
| 2015/0261456 A1 | 9/2015 | Alcantara et al. |
| 2015/0263978 A1 | 9/2015 | Olson |
| 2015/0309734 A1 | 10/2015 | Brondjik |
| 2015/0324264 A1 | 11/2015 | Vidypoornachy et al. |
| 2015/0347041 A1 | 12/2015 | Kotte et al. |
| 2015/0347291 A1 | 12/2015 | Choi |
| 2015/0347296 A1 | 12/2015 | Kotte |
| 2015/0355965 A1 | 12/2015 | Peddle |
| 2015/0363120 A1 | 12/2015 | Chen |
| 2015/0378613 A1 | 12/2015 | Koseki |
| 2015/0378886 A1 | 12/2015 | Nemazie |
| 2016/0011818 A1 | 1/2016 | Hashimoto |
| 2016/0018998 A1 | 1/2016 | Mohan et al. |
| 2016/0019148 A1 | 1/2016 | Vekiarides |
| 2016/0019159 A1 | 1/2016 | Ueda |
| 2016/0026564 A1 | 1/2016 | Manning |
| 2016/0070496 A1 | 3/2016 | Cohen |
| 2016/0092116 A1 | 3/2016 | Liu |
| 2016/0147669 A1 | 5/2016 | Huang |
| 2016/0179664 A1 | 6/2016 | Camp |
| 2016/0202910 A1 | 7/2016 | Ravimohan |
| 2016/0253091 A1 | 9/2016 | Ayyavu |
| 2016/0342509 A1 | 11/2016 | Kotte et al. |
| 2016/0357462 A1 | 12/2016 | Nam et al. |
| 2016/0364179 A1 | 12/2016 | Tsai et al. |
| 2017/0031699 A1 | 2/2017 | Banerjee et al. |
| 2017/0075620 A1 | 3/2017 | Yamamoto |
| 2017/0139838 A1 | 5/2017 | Tomlin |
| 2017/0220287 A1 | 8/2017 | Wei |
| 2017/0364445 A1 | 12/2017 | Allison |
| 2018/0046480 A1 | 2/2018 | Dong |
| 2020/0363996 A1 | 11/2020 | Kanno |
| 2021/0064293 A1 | 3/2021 | Cho |

FOREIGN PATENT DOCUMENTS

| | | |
|---|---|---|
| JP | 2011203916 A | 10/2011 |
| WO | 2009084724 A1 | 7/2009 |
| WO | 2009100149 A1 | 8/2009 |
| WO | WO2010027983 A1 | 3/2010 |

OTHER PUBLICATIONS

C. Kuo et al., "Detecting Solid-State Disk Geometry for Write Pattern Optimization," 2011 IEEE 17th International Conference on Embedded and Real-Time Computing Systems and Applications, 2011, pp. 89-94.

S. Im and D. Shin, "Flash-aware RAID techniques for dependable and high-performance flash memory SSD," IEEE Transactions on Computers, V. 60, No. 1, pp. 80-92, Jan. 2011.

J. Kim et al., "A methodology for extracting performance parameters in solid state disks (SSDs)," 2009 IEEE International Symposium on Modeling, Analysis & Simulation of Computer and Telecommunication Systems, 2009, pp. 1-10.

W. Lafi et al., "High level modeling and performance evaluation of address mapping in NAND flash memory," 2009 16th IEEE International Conference on Electronics, Circuits and Systems (ICECS 2009), Yasmine Hammamet, 2009, pp. 659-662.

Tennison, RD, "Memory space mapping using virtual addressing to multiple sized memory units," IP.com, prior art database technical disclosure, Aug. 1, 1975.

Y. Hu et al., "Achieving page-mapping FTL performance at block-mapping FTL cost by hiding address translation," 2010 IEEE 26th Symposium on Mass Storage Systems and Technologies (MSST), Incline Village, NV, USA, May 3, 2010, pp. 1-12, doi: 10.1109/MSST.2010.5496970.

Chang et al., "An efficient FTL design for multi-chipped solid-state drives," 2010 IEEE 16th Int'l. Conference on Embedded and Real-Time Computing Systems and Applications, 2010, pp. 237-246.

NVM Express, Version 1.0b, Jul. 12, 2011, pp. 1-126, published at http://www.nvmexpress.org/resources/ by the NVM Express Work Group.

John D. Strunk, "Hybrid Aggregates: Combining SSDs and HDDs in a single storage pool," Dec. 15, 2012, ACM SIGOPS Operating Systems Review archive, vol. 46 Issue 3, Dec. 2012, pp. 50-56.

Yiying Zhang, Leo Prasath Arulraj, Andrea C. Arpaci-Dusseau, Remzi H. Arpaci-Dusseau, Computer Sciences Department, University of Wisconsin-Madison, "De-indirection for Flash-based SSDs with NamelessWrites," published at https://www.usenix.org/conference/fast12/de-indirection-flash-based-ssds-nameless-writes, Feb. 7, 2012, pp. 1-16.

Andrea C. Arpaci-Dusseau, Remzi H. Arpaci-Dusseau, and Vijayan Prabhakaran, "ResearchRemoving the Costs of Indirection in Flash-based SSDs with NamelessWrites," Jun. 22, 2010, pp. 1-5, published at www.cs.wisc.edu/wind/Publications/hotstorage10-nameless.pdf by Computer Sciences Department, University of Wisconsin-Madison and Microsoft Research.

Stan Park and Kai Shen, Department of Computer Science, University of Rochester, "FIOS: A Fair, Efficient Flash I/O Scheduler," Feb. 23, 2012, pp. 1-15, published at www.usenix.org/event/fast12/tech/full_papers/Park.pdf by the Advanced Computing Systems Association, Fast'12, 10th Usenix Conference on File and Storage Technologies, San Jose.

Eric Seppanen, Matthew T. O'Keefe, David J. Lilja, Department of Electrical and Computer Engineering, University of Minnesota, "High Performance Solid State Storage Under Linux," Apr. 10, 2010, MSST '10 Proceedings of the 2010 IEEE 26th Symposium on Mass Storage Systems and Technologies (MSST), pp. 1-12.

Xiangyong Ouyangyz, David Nellansy, Robert Wipfely, David Flynny, Dhabaleswar K. Pandaz, "Beyond Block I/O: Rethinking Traditional Storage Primitives," Aug. 20, 2011, published at http://www.sciweavers.org/read/beyond-block-i-o-rethinking-traditional-storage-primitives-327868, by Fusion IO and the Ohio State University.

Intel Corp, PCI-SIG SR-IOV Primer—An Introduction to SR-IOV Technology,: 321211-002, Revision 2.5, Jan. 2011, 28 pages.

Open NAND Flash Interface (ONFI), specification, version 2.0, 174 pages, Feb. 27, 2008.

Open NAND Flash Interface (ONFI), specification, version 3.1, 296 pages Sep. 19, 2012.

NVM Express, V. 1.2.1, 217 pages, Jun. 3, 2016.

Garth Gibson, Greg Ganger, "Principles of Operation for Shingled Disk Devices," Canregie Mellon Parallel Data Laboratory, CMU-PDL-11-107, Apr. 2011, 9 pages.

Li-Pin Chang, "Hybrid Solid State Disks: Combining Heterogeneous NAND Flash in Large SSDs," National Chiao-Tung University, Taiwan, ASPDAC 2008, 26 pages.

Hua Wangx, Ping Huangxz, Shuang Hex, Ke Zhoux, Chunhua Lix, and Xubin He, "A Novel I/O Scheduler for SSD with Improved Performance and Lifetime," Mass Storage Systems and Technologies (MSST), 2013 IEEE 29th Symposium on, May 6-10, 2013, 5 pages.

Altera Corp. et al., "Hybrid Memory Cube" specification, 2012, 122 pages.

JEDEC Standard, JESD229, Wide IO, Dec. 2011, 74 pages.

Li-Pin Chang, "Hybrid Solid State Disks: Combining Heterogeneous NAND Flash in Large SSDs," National Chiao-Tung University, Taiwan, 978-1-4244-1922-7/08, 2008 IEEE, 6 pages.

(56) References Cited

OTHER PUBLICATIONS

Optimizing NAND Flash Performance, Flash Memory Summit, Santa Clara, CA USA Aug. 2008, Ryan Fisher, pp. 1-23.

High-Speed NAND Flash: Design Considerations to Maximize Performance, Flash Memory Summit, Santa Clara, CA USA Aug. 11, 2009, , Robert Pierce, pp. 1-19.

NAND 201: An Update on the Continued Evolution of NAND Flash, Jim Cooke, Micron White Paper, Sep. 6, 2011, pp. 1-10.

Spansion SLC NAND Flash Memory for Embedded, data sheet, S34ML01G1, S34ML02G1, S34ML04G1, Sep. 6, 2012, pp. 1-73.

Wang et al., "An Efficient Design and Implementation of LSM-Tree based Key-Value Store on Open Channel SSD," EuroSys '14 Proceedings of the Ninth European Conference on Computer Systems, Article No. 16, Apr. 14, 2014, 14 pages.

Ouyang et al., "SDF: Software-defined flash for web-scale internet storage systems," Computer Architecture News—ASPLOS '14, vol. 42 Issue 1, Mar. 2014, 14 pages.

Macko et al., "Tracking Back References in a Write-Anywhere File System," FAST'10 Proceedings of the 8th USENIX conference on File and storage technologies, 14 pages, Feb. 23, 2010.

Ohad, Rodeh, "IBM Research Report Defragmentation Mechanisms for Copy-on-Write File-systems," IBM white paper, Apr. 26, 2010, 10 pages, available at domino.watson.ibm.com/library/CyberDig.nsf/papers/298A0EF3C2CDB17B852577070056B41F/$File/rj10465.pdf.

Michael Cornwell, "Anatomy of a solid-state drive," Oct. 17, 2012, pp. 1-13, https://queue.acm.org/detail.cfm?id=2385276.

Kang et al., "A Superblock-based Flash Translation Layer for NAND Flash Memory," EMSOFT'06, Seoul, Korea, Oct. 22, 2006, ACM 1-59593-542-8/06/0010, pp. 161-170.

TN-29-28: Memory Management in NAND Flash Arrays, Micron publication, 2005, 10 pages, available from https://www.micron.com/-/media/client/global/documents/products/technical-note/nand-flash/tn2928.pdf.

Park et al., "A Reconfigurable FTL (Flash Translation Layer) Architecture for NAND Flash-Based Applications," 23 pages, ACM Transactions on Embedded Computing Systems, vol. 7, No. 4, Article 38, Publication date: Jul. 2008.

Gupta et al., "DFTL: A Flash Translation Layer Employing Demand-based Selective Caching of Page-level Address Mappings," ASPLOS'09, Mar. 7-11, 2009, Washington, DC, USA, 12 pages.

Ruia, Virtualization of Non-Volatile RAM, Texas A&M Masters Thesis, 77 pages, May 2015, available from: https://oaktrust.library.tamu.edu/bitstream/handle/1969.1/154981/RUIA-THESIS-2015.pdf?sequence=1&isAllowed=y.

Hsieh et al., "Efficient Identification of Hot Data for Flash Memory Storage Systems," ACM Transactions on Storage, vol. 2, No. 1, Feb. 2006, 19 Pages (pp. 22-40).

Wu et al., "An Adaptive Two-Level Management for the Flash Translation Layer in Embedded Systems," https://dl.acm.org/doi/pdf/10.1145/1233501.1233624, Date of Publication: Nov. 9, 2006.

Grupp et al., "Characterizing Flash Memory: Anomalies, Observations, and Applications," https://dl.acm.org/doi/pdf/10.1145/1669112.1669118, Dec. 16, 2006.

Huang et al., "Unified Address Translation for Memory-Mapped SSDs with FlashMap," https://dl.acm.org/doi/10.1145/2749469.2750420, Jun. 15, 2015.

Bang et al., "A Memory Hierarchy-Aware Metadata Management Technique for Solid State Disks," https://ieeexplore.ieee.org/document/6026485, Aug. 10, 2011.

\* cited by examiner

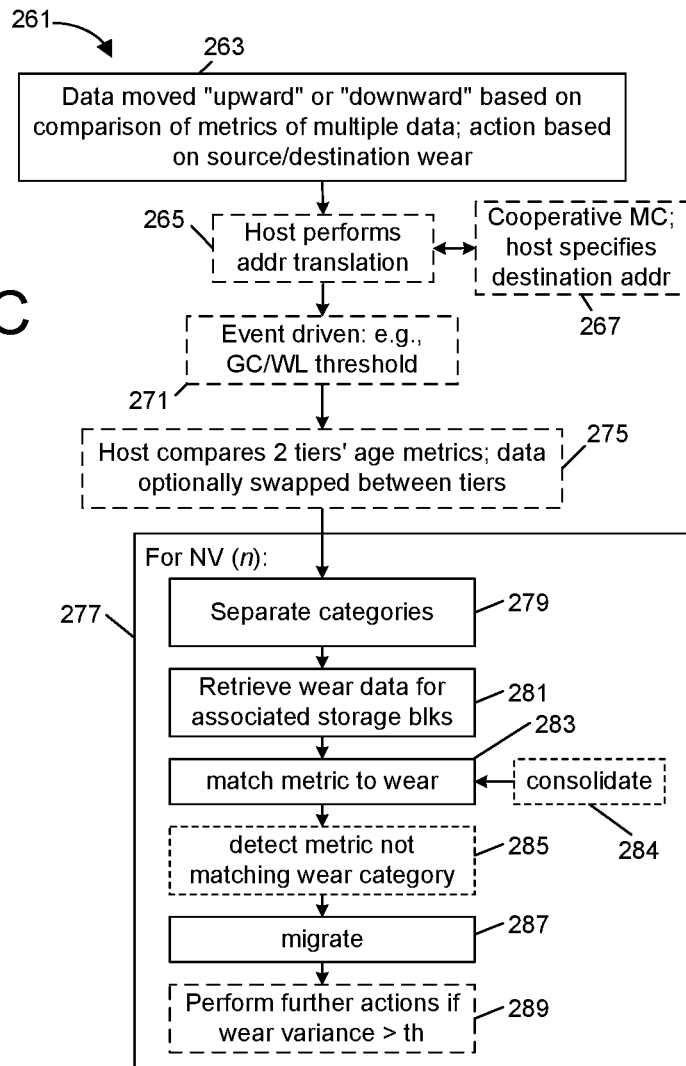

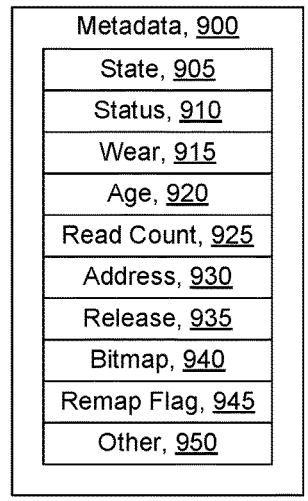
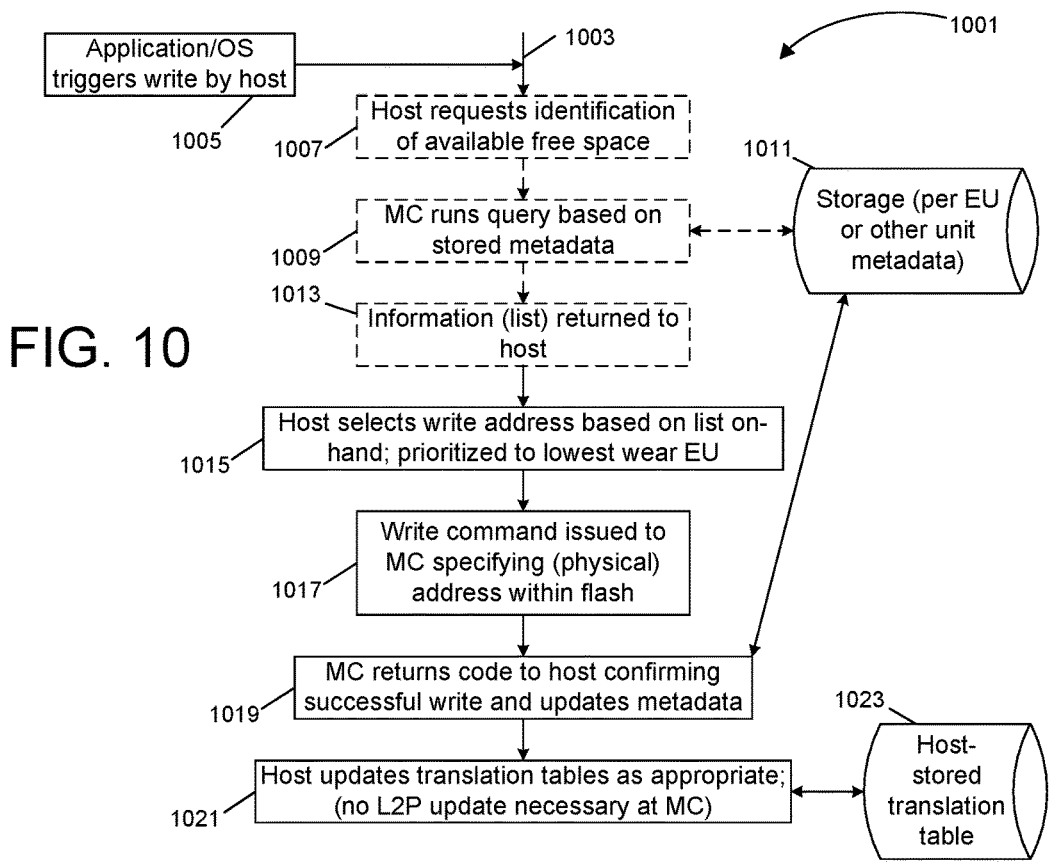

MEMORY MANAGEMENT OF NONVOLATILE DISCRETE NAMESPACES

This disclosure is a continuation of U.S. patent application Ser. No. 17/568,891, filed on Jan. 5, 2022, on behalf of first-named inventor Andrey V. Kuzmin, which is a continuation of U.S. patent application Ser. No. 16/832,793, filed on Mar. 27, 2020, also on behalf of first-named inventor Andrey V. Kuzmin (now U.S. patent Ser. No. 11/249,652), which is a continuation of U.S. patent application Ser. No. 14/848,273, filed on Sep. 8, 2015, also on behalf of first-named inventor Andrey V. Kuzmin (now U.S. patent Ser. No. 10/642,505); in turn, U.S. patent application Ser. No. 14/848,273 is a continuation in-part of U.S. patent application Ser. No. 14/047,193, filed on Oct. 7, 2013 (now U.S. Pat. No. 9,229,854), which in turn is a continuation in-part of U.S. patent application Ser. No. 13/767,723, filed Feb. 14, 2013 (now U.S. Pat. No. 9,652,376), which in turn claims priority to U.S. Provisional Patent Application No. 61/757,464, filed on Jan. 28, 2013. U.S. patent application Ser. No. 14/848,273 also claims priority to U.S. Provisional Patent Application No. 62/063,357, filed on Oct. 13, 2014, and to U.S. Provisional Patent Application No. 62/048,162, filed on Sep. 9, 2014. Each of the aforementioned patent applications is hereby relied upon for priority and is incorporated herein by reference.

This disclosure relates to storage systems and, more specifically, to the architecture of storage systems that utilize nonvolatile memory storage media. Still more particularly, the present disclosure relates to data placement and migration techniques that facilitate more efficient integration and utilization of nonvolatile memory, especially flash-based storage, in heterogeneous storage systems.

BACKGROUND

Storage systems, from embedded to datacenter, utilize storage media to store user data written to the system and to retrieve that data on a user's request. Storage systems can be homogeneous, built from the uniform storage media with the same access and/or endurance characteristics, or heterogeneous, comprising multiple media types as distinguished by their latency, throughput, endurance or other performance factors. Media of the same type in such a system are organized in tiers, with each tier characterized by its underlying media type-specific features. The different media characteristics in heterogeneous systems can provide advantages that are leveraged during system operation. For example, in personal computer systems, dynamic random access memory ("DRAM") provides very quick access but does not retain data once power is removed, whereas a hard disk drive ("HDD") provides relatively slow access compared to DRAM but retains data once power is removed; many systems will therefore use DRAM as "active memory" to provide for quick data retrieval and storage of frequently used data while the computer is in active use, while data which is less frequently used (and all data to be retained when such systems are shut down) is committed to the HDD. However, because of different access latencies and management requirements can affect pipelining, which is directly tied to speed of operation in many systems, it is typically desired to place data intelligently (i.e., to deliberately select an appropriate "tier" for storing data in a heterogeneous system); for example, data that is mostly read and is not frequently overwritten such as audio files can be placed in relatively slow access memory (such as a HDD or other nonvolatile memory) while data that is frequently overwritten can be placed in DRAM or other fast access volatile memory.

What is needed are techniques for more efficiently managing operation of nonvolatile memory. Still more particularly, what is needed are techniques for more efficiently managing memory in a heterogeneous memory system. The present invention addresses these needs and provides further, related advantages.

BRIEF DESCRIPTION OF THE FIGURES

FIG. 2C is a flow chart that shows one method of data migration that can, for example, be optionally used for the systems depicted in FIG. 1A and FIG. 1B.

FIG. 3A is an illustrative diagram showing a table of one form of per-data metrics optionally tracked by the host.

FIG. 9 a diagram showing examples of information that can be kept by a memory controller for each of plural physical subdivisions of memory or for data stored in a particular location, e.g., as per-data metrics.

FIG. 10 shows a process associated with wear-aware writes.

Figure 1A:
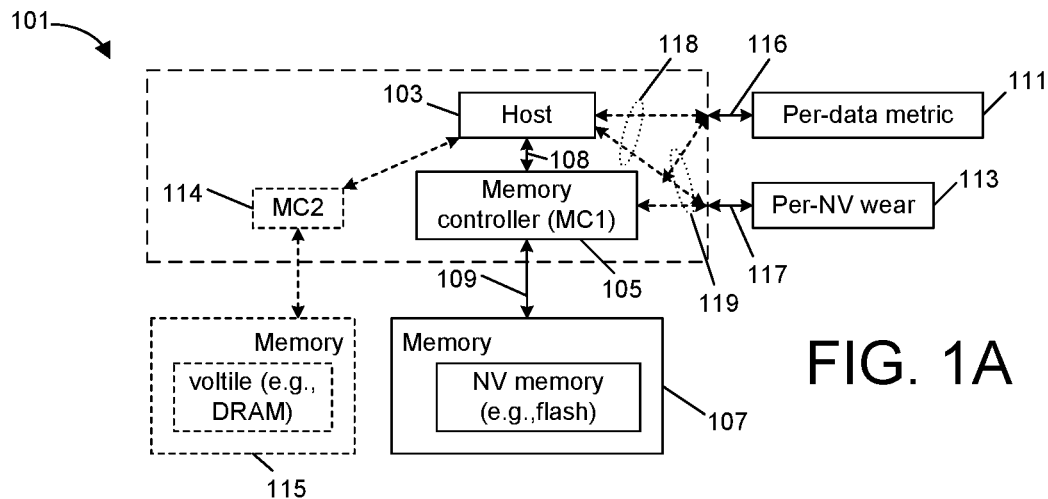
FIG. 1A is an illustrative diagram of a system having a memory controller 203, a host 205 and a memory 207.

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application to certain methods and devices. The description set out below exemplifies methods supporting data migration in a memory system, using metrics individually tracked for data and wear metrics individually tracked for at least some nonvolatile memory locations;

such techniques can be practiced in one embodiment by a host, in another embodiment by a memory controller (e.g., within a single drive), and in a third embodiment by a host cooperating with one or more memory controllers. This disclosure also provides improved designs for a memory controller, host, a memory system, a subsystem (such as a drive, e.g., a solid state drive or "SSD"), and numerous data management and migration methods. The disclosed techniques can also be implemented in software or instructions for fabricating an integrated circuit (e.g., a circuit design file or field programmable gate array or "FPGA" configuration) or in the form of data arranged dependent on wear in non-transitory memory. While the specific examples are presented, particularly in the context of flash memory, the principles described herein may also be applied to other methods, devices and systems as well.

DETAILED DESCRIPTION

I. Introduction

This disclosure provides techniques for data storage and/or migration based on metrics generated or tracked for respective data ("per-data metrics") and based on memory degradation. In one embodiment, a memory system includes memory having at least one tier of non-volatile ("NV") memory; this tier can be comprised of one or more NAND flash memory integrated circuits ("ICs"), but the invention is not so-limited. The system or one of its components generates information that identifies hot/cold status, age, or another metric characterizing respective data, and it also tracks life cycle wear or degradation for at least one tier of NV memory; the system (or a host or a memory controller or both) uses both these persistence metrics and/or wear in managing a memory operation.

In one specific implementation of this first embodiment, a memory system includes a tier of volatile memory (e.g., DRAM) and a tier of NV memory (e.g., a tier of NAND flash memory). Each tier includes one or more integrated circuits ("ICs") or memory dies, and an associated memory controller. Each tier is operated to write and read data items until a trigger indicates that a tier should be examined to release some memory space for new data storage, or to perform other management operations. In a specific embodiment, if a minimum free space is to be preserved, a memory controller, the host or both executes a routine where data is identified in the memory that violates a hot/cold, persistence or age criterion for that memory, or alternatively, that the host, memory controller or both, deems more suitable to a different location within the same tier of memory or a different memory tier; the identified data is then moved (and can be written into a different tier, as appropriate). Two introductory examples will be provided for this specific embodiment.

First, it should be assumed that volatile memory is operated with a minimum of reserved or free space. The pertinent memory controller, e.g., a DRAM memory controller, stores data and services read requests as commanded by a host. At some point in time, the DRAM memory controller determines that it no longer has a sufficient "free space" reserve, or alternatively, that it needs to evict at least some data to make room for new data. Either it or the host then executes an eviction protocol that: (1) determines that the DRAM is preferentially reserved for "hot" or "young" data; (2a) identifies the coldest/oldest data in the DRAM, and/or (2b) identifies all data that is colder or older than a threshold; and (3) evicts the identified data from the DRAM, thereby adding to the reserve of available memory space in DRAM. Note that this process can be repeated as a loop, as appropriate, until sufficient space is free. Evicted data is sent to other memory, in this case, the NV memory tier. As new data is sent to the NV memory tier, it can be written into the least available worn location in NV memory tier, determined according to the tracked wear data. Note that the hot/cold or age information for evicted data can be generated on the fly (e.g., as data is evicted from memory, with a flag for example being added to the evicted data and used to distinguish it from non-previously cached data). In an alternate embodiment, such an informational metric can optionally be continuously tracked and stored with the data as metadata (e.g., age since last write of the data or an associated logical or physical address, permitting an inference of how likely the data is to be overwritten); other measures can also be used.

As a second example, it should be assumed that it is desired to maintain a reserve of free, available (e.g., already erased) memory space in NV memory. The pertinent memory controller, e.g., a NAND flash memory controller, programs data and services read requests as commanded by a host. At some point in time, the NAND flash memory controller determines that it no longer has a sufficient reserve of free physical pages available on hand to assign to new write requests. Either it or the host then executes a protocol to make additional space available. In one embodiment, this process can be performed by a garbage collection process that consolidates data by matching tracked metrics of respective data, e.g., such that data having a similar age or hot/cold status can be grouped together. In a second embodiment, hot/cold data can be used to move the identified data to another memory IC or device within the same tier, i.e., to balance traffic; for example, in a multi-die flash embodiment, per data age or hot/cold metrics can be used to stripe such information across plural ICs or devices, so as to minimize the likelihood than any one IC or device experiences a transaction bottleneck relative to others. [Note that this embodiment is optionally practiced without tracked wear metrics.] In a third embodiment, a host and/or memory controller can evict data from a NV memory tier to another tier: for example, relative to a NAND flash implementation, the memory controller and/or host can either (a) identify the hottest/youngest data in the NAND flash memory using the per-data tracked metric and/or identify all data that is hotter or younger than a threshold, and evict this data to other memory, or (b) identify the coldest/oldest data in the NAND flash memory using the per-data tracked metric and/or identify all data that is colder or older than a threshold, and evict this data to other memory. For example, young or hot data can be moved to DRAM, or conversely, old or cold data can be written to a HDD. Once again, note that hot/cold status and/or age of evicted data can optionally be generated on-the-fly (e.g., by a NAND flash memory controller) or it can also be a tracked parameter (e.g., age-since-write, or another metric), depending on embodiment.

Note that these two models can be optionally employed together; that is, a memory system is not limited to having only volatile memory and NV memory tiers, and for example can have many other tiers of memory. Thus, it is possible to send "cold" data "downward" from DRAM and "upward" from flash, and it is also possible to employ similar process for other tiers, e.g., hard disk drives ("HDDs"), shingle drives, solid state drives ("SSDs"), resistive random access memory (RRAM), and nearly any other forms of storage, volatile or NV, local, direct-attached or remote; as these various examples illustrate, there can be more than one tier of volatile memory and more than one tier of NV memory. Also, various additional schemes can be used to manage data in such a system; for example, the volatile memory can also be used for caching data read from one or more other tiers; any time data is read from the NV memory tier, it can be stored in volatile memory (e.g., DRAM), and a pointer used to identify corresponding data in another tier. If the data is updated while multiple such copies exist, such an update can optionally be used to: (a) immediately release the instance of data still retained in NV memory; and/or (b) update per-data metrics for one or both copies of the data, e.g., by updating metadata stored for the pertinent memory location. Note also again in some embodiments that both the host and one or more memory controllers can track various metrics; for example, in one embodiment below, the host tracks hot/cold information at the file level, each memory controller tracks both hot/cold information (or another per-data parameter) for each data item stored in managed memory, and each NV memory controller tracks wear data for each managed host-accessible storage location.

In a second specific implementation, techniques for managing memory are implemented as a form of garbage collection or wear leveling for at least one tier of NV memory. For such an embodiment, a host and/or one or more memory controllers use tracked hot/cold information (or other per-data tracked metrics) to match the data to a storage location. For example, such techniques can be implemented in connection with garbage collection or independently as a form of wear leveling. It should be assumed that for some reason it is desired to relocate first data to a location in NV memory where that data has tracked hot/cold information (or another tracked parameter specific to the data), and where the first data in size represents a subset of a minimal size erasable unit of the NV memory tier (e.g., an "EU," meaning that size of unit given the type of NV memory that must be erased together). This relocation might be triggered because of a garbage collection operation, a wear leveling operation, or because of some other system event, condition or maintenance. For a garbage collection process, to store the data as efficiently as possible, the host and/or a memory controller identifies other second data having a similar hot/cold characteristic or age, and it stores the first data and the second data together. The host and/or a memory controller optionally select a destination write location for both data dependent on tracked wear information. As an example, if the consolidated data is "hot" or "young" as determined from the tracked age metrics, then the data can optionally be stored in a memory location having very low wear relative to other memory as determined from the tracked wear data (e.g., within the given tier or alternatively, in another memory tier, such as in DRAM); this technique then presumably equalizes wear across the memory tier, because this location will presumably be recycled "more often" than other locations which store colder data, thus permitting low wear memory locations to "catch up" over time, with wear across the device ultimately being balanced. Conversely, if the relocated data is "cold" or "old" as determined from the tracked per-data metrics, then the data can optionally be stored in relatively high wear memory, as determined from the tracked wear data (e.g., the data can be written to available NAND flash memory with the highest wear); once again, this levelizes wear over time across the memory device. Naturally, once again, these techniques can be extended to multiple tiers of memory.

As these examples illustrate, various embodiments can be implemented within a single tier of memory or across multiple tiers.

In yet other embodiments, a host and/or a memory controller can perform data eviction or targeted writes to memory according to tracked data hot/cold or age information and memory location wear data, or it can swap data between tiers of memory, for example, by comparing tracked hot/cold or age information to memory location wear data and matching respective data to the most suitable location. These implementations are intended to be non-limiting examples of the data migration techniques discussed herein, and other examples will readily occur to those skilled in the art.

This disclosure will also discuss optional architectures for a cooperative memory controller, and host and/or memory controller optional processes that facilitate some the memory management techniques introduced above. For example, a memory controller architecture is presented below which tracks metadata for each storage location managed by that memory controller. In one embodiment, such metadata includes status information for each physical memory location managed by that controller which is accessible for storing host data, regardless of whether currently valid (i.e., unreleased data) is stored in the pertinent memory location or not. For example, an exemplary NAND flash memory controller can store for every erase unit ("EU") of memory cells managed by that memory controller and for each physical page of memory cells corresponding to each erase unit: (a) hot/cold state of any data or logical page address associated with data stored there (or a similar metric such as an indication of age), (b) page release status, (c) wear information such as an erase count, (d) physical-to-logical ("P2L") reverse address lookup information, and (e) other types of metadata. Note this structure is not required for all embodiments, e.g., in one embodiment, the memory controller can just store wear information for managed memory. In another variation, the memory controller and/or the host stores per-data metrics, tracked according to either logical address or physical address. In still another embodiment, the host can track all wear or degradation information for one or more tiers of memory. Advantageously, in one embodiment, a NAND flash memory controller stores both sets of information, indexed by physical address, and also serves the host with status information that permits the host to address memory with limited logical-to-physical ("L2P") translation required by the memory controller itself. This cooperative memory controller design should be considered optional relative to the data management and data migration techniques discussed above. In one system level embodiment, there can be a memory controller dedicated to each of multiple memory tiers (e.g., a DRAM tier, a flash tier, a HDD tier and so forth); the memory controller for each tier can optionally store its own management table of per-data information indexed by logical or physical address, and the memory controller for each tier can optionally store its own management table of tracked wear data (e.g., indexed according physical address). Other embodiments are also possible.

Note that many types of different per-data metrics can be tracked in various embodiments, and that this information can be tracked at different levels of granularity and at different locations. First, in one embodiment, a time stamp or other number is applied that represents one form of an age-since-write value (i.e., a value correlated to a measure of time since the specific data was last changed or was first written to memory if never changed). In a second embodiment, the data can be represent hot/cold information, for example, optionally as little as a single bit representing whether or not a new write command is for data that has just been evicted or is being relocation from elsewhere in memory (e.g., as opposed newly arriving external data). In yet another embodiment, information can be inferred from heuristics, for example, based on a "like" indication or a rating given to a file by a user (e.g., to an audio file); if a user ranks a particular MP3 file poorly, it can be inferred that the user is unlikely to play that music frequently, or conversely, will be more likely to overwrite that data in the future. Other factors such as bit error rate and temperature over time can also be used as a measure of age; for example, a bit error rate associated with a logical or physical page or erase unit can be tracked and used to presume age, such that a logical page address with a high bit error rate is deemed "old" and such that a logical page address with a low bit error rate is deemed "young;" similarly, a high temperature over time characteristic can be used to deem data at a logical page address "old" and a low temperature over time characteristic can be used to deem data at a logical page address "young." Many examples are possible. Generally speaking, this type of information represents variable utility of specific stored data (or data that is to be stored). The host, a memory controller or both use this information to infer that specific data is likely to be overwritten or used than other data, and the information is applied to the specific data in question dependent on some type of tracked or measured usage of the specific data (e.g., as contrasted with file type, for example).

Also, many of the techniques described herein can be employed in an apparatus, a method, an integrated circuit, a system on-chip, a memory device, a memory controller, a host processor, as a circuit description (i.e., that contains data structures defining fabrication parameters for a processor, integrated circuit, device, or components of any of these things), as instructions stored on machine-readable media (e.g., software intended for execution on one or more general purpose machines), as data stored in non-transitory memory, or as combinations of these things. In the case of software or other instructional logic, the instructions are typically written or designed in a manner that has certain structure (architectural features) such that, when they are ultimately executed, they cause the one or more general purpose machines or hardware to behave as special purpose machines, having structure configured by the instructions to necessarily perform certain described tasks. "Non-transitory machine-readable media" means any tangible (i.e., physical) storage medium, irrespective of how data on that medium is stored, including without limitation, random access memory, hard disk memory, optical memory, a floppy disk or CD, server storage, volatile memory and other tangible mechanisms where instructions may subsequently be retrieved by a machine. The machine-readable media can be in stand-alone form (e.g., a program disk) or embodied as part of a larger mechanism, for example, a laptop computer, portable or mobile device, server, data center, "blade" device, subsystem, electronics "card," storage device, network, or other set of one or more other forms of devices. The instructions can be implemented in different formats, for example, as metadata that when called is effective to invoke a certain action, as Java code or scripting, as code written in a specific programming language (e.g., as C++ code), as a processor-specific instruction set, or in some other form; the instructions can also be executed by the same processor or different processors, depending on embodiment. For example, in one implementation, instructions on non-transitory machine-readable media can be executed by a single computer and, in other cases as noted, can be stored and/or executed on a distributed basis, e.g., using one or more servers, web clients, or application-specific devices. Each function mentioned in the disclosure or FIGS. can be implemented as part of a combined program or as a standalone module, either stored together on a single media expression (e.g., single floppy disk) or on multiple, separate storage devices. The same is also true for a circuit description for fabricating cores, processors, devices or circuits described herein, i.e., the result of creating a design can be stored in non-transitory machine-readable media for temporary or permanent use, either on the same machine or for use on one or more other machines; for example, a circuit description or software can be generated using a first machine, and then stored for transfer to a printer or manufacturing device, e.g., for download via the internet (or another network) or for manual transport (e.g., via a transport media such as a DVD) for use on another machine. Throughout this disclosure, various processes will be described, any of which can generally be implemented as instructional logic (instructions stored on non-transitory machine-readable media), as hardware logic, or as a combination of these things.

FIG. 1A illustrates a first embodiment of a system, generally designated by reference numeral 101. The system can optionally be a homogeneous memory system, that is having a single tier of memory 107, or a heterogeneous system, that is, having more than one tier of memory, such as exemplified by NV memory 107 as a first tier and volatile memory 115 as a second, optional tier. A host 103 refers to one or more machines, circuits or devices from which memory access requests originate, for example, to store data (write), to retrieve data (read) and so forth. The host typically comprises at least one operating system and application software run on one or more computers, for example, portable devices, laptops, desktops, embedded machines, servers, clusters of machines, networks, or other sources of memory requests. Such requests are directed to a memory controller 105, which is charged with the management of memory 107 and the performance of tasks delegated by one or more host machines. For example, NAND flash memory is typically written using a series of "program-verify" (or "PV") cycles; the memory controller performs many specialized management tasks relating to maintaining such memory, tasks sometimes transparent to the host. For example, a flash memory controller typically stores a page of data to be written to memory through the use of individual programming cycles (e.g., each using sets of voltage pulses) in an attempt to cause a page of memory cells (e.g., $128k$ memory cells) to adopt respective values corresponding to the data to be stored; such an operation can take time and is typically delegated by the host. For example, after a first programming part of each PV cycle, the memory controller 105 reads results out of the just-written page of memory cells and compares this (e.g., exclusive-ORs this data) with the original write data, such that data stored in a write buffer represents only additional values which need be changed relative to prior programming. After this "verify" part of the operation, as necessary, the memory controller uses one or more ensuing PV cycles (often using a slightly higher voltage) until all memory cells for the page in question adopt the proper value and there remains no additional data to be written. In the case of this example, the host 103 might send a write command with write data to the memory controller 105, via one or more links 108, and the memory controller 105 would (transparent to the host) manage the operations necessary to achieve proper programming in the memory 107, via link 109 which connects the memory controller 105 with the memory 107. Note that the memory controller 105 is typically housed in its own integrated circuit ("IC"), but this need not be the case for all embodiments. For example, in one embodiment, the memory controller 105 is embodied as a distributed set of circuits (e.g., as an application-specific hardware design), or via a field programmable gate array ("FPGA"). In another embodiment, the functions of the memory controller can be merged with functions of the host (e.g., these circuits can be copackaged, as indicated by the presence of a dashed-line box around both elements), for example, mounted together on a common board or in a common package or die. In yet another embodiment, these circuits can be collocated with memory (e.g., on the same board or card, as a system on a chip, or in some other manner), or one or more of them can be remote relative to the memory, for example, communicating across a local or wide area network ("LAN" or "WAN," respectively). The Internet is an example of a WAN. In yet another embodiment, the memory controller 105 can be collocated with memory 107 in much the same manner, for example, communicating with a local or remote host 103.

As noted earlier, in one embodiment, the host 103, the memory controller 105, or both, use per-data metrics 111 tracked for respective data stored in memory 107 and wear data 113 for each NV memory location accessible to store host data for at least one tier of NV memory. Note in this regard that the memory includes at least some NV memory but it can optionally include more than one type of NV memory and it can optionally include other types of memory, such dynamic random access memory ("DRAM"). Volatile memory is memory that requires application of power in order to preserve stored data; for example, DRAM is a type of inexpensive, very fast, reliable memory in which data is stored in the form of a charge on a capacitor for each memory cell. Because this charge leaks over time, data must periodically be read out of a particular memory location and rewritten to that location in order to maintain the integrity of the stored data values; if power is lost, the data is typically lost as well. There are also many types of volatile memory other than DRAM. There are also many forms of NV memory; for example, some common forms of NV memory include without limitation flash memory, silicon-oxide-nitride-oxide-silicon (SONOS) memory, magnetic memory of various types (including hard disk drives), magnetic random access memory (MRAM), phase change random access memory (PCRAM), resistive random access memory (RRAM), shingle drive memory, nanowire memory, optical storage (such as compact disks, digital video disks or "DVDs," Bluray disks, and other forms), and other types of memory. For embodiments which continuously track per-data metrics for respective data as well as wear for NV memory, such embodiments typically track hot/cold and/or persistence metrics for all data managed by the host or the memory controller (depending on embodiment), irrespective of memory type in which the data is stored, and such embodiments typically track wear data for at least one type of NV memory (such as flash memory, RRAM, a hard disk drive or HDD, and so forth); note that this can be applied to a system with only one memory type (e.g., all metrics tracked for data stored in flash) or for complex memory types (e.g., for heterogeneous memory systems comprising two or more tiers of memory, such as one or more types of volatile memory and/or NV memory). The per-data metrics and wear data can be stored in any desired manner, for example, as a multi-entried table, as a set of diverse, stored values in disparate buffers or memory locations, on-board one or more host machines, on-board one or more memory controllers, or in memory itself. As this discussion implies, there can be more than one memory controller (and associated memory) per host. For example, in one embodiment, there can optionally be a second memory controller 114 with its own managed memory 115; this structure can be advantageous in some circumstances where very different maintenance operations are to be performed for different types of memory (e.g., a system having both DRAM and flash might have dedicated memory controllers for each, so that operations in one memory tier are unaffected by the performance of maintenance operations in the other). Many combinations are possible. Optionally, therefore, each memory controller can be used to manage a dedicated type or types of memory (e.g., a flash memory controller advantageously performs flash management tasks such as wear leveling and garbage collection for flash memory, while a DRAM memory controller performs DRAM management tasks such as refresh), but this need not be the case for all embodiments. That is, one memory controller (such as memory controller 105) can optionally be configured to collectively manage multiple types of memory, multiple integrated circuits, multiple dies or in some other combination. As indicated by arrows 116 and 117, and associated routing ellipses 118 and 119, tracked metrics (such as per-data metrics for respective data and wear data for NV memory) can be provided to, and used by one or more host machines, one or more memory controllers, or any combination of these things, depending on embodiment; for example, many of the data and memory management techniques can be embodied in a manner where they are exclusively practiced by a host. Alternatively, the same techniques can in some embodiments be exclusively practiced by one or more memory controllers. Finally, in some embodiments, the host and one or more memory controllers are structured in a manner such that they cooperate, exchanging information in a manner so as to efficiently manage data and/or memory. Embodiments corresponding to each of these variations will be further described below.

Figure 1B:
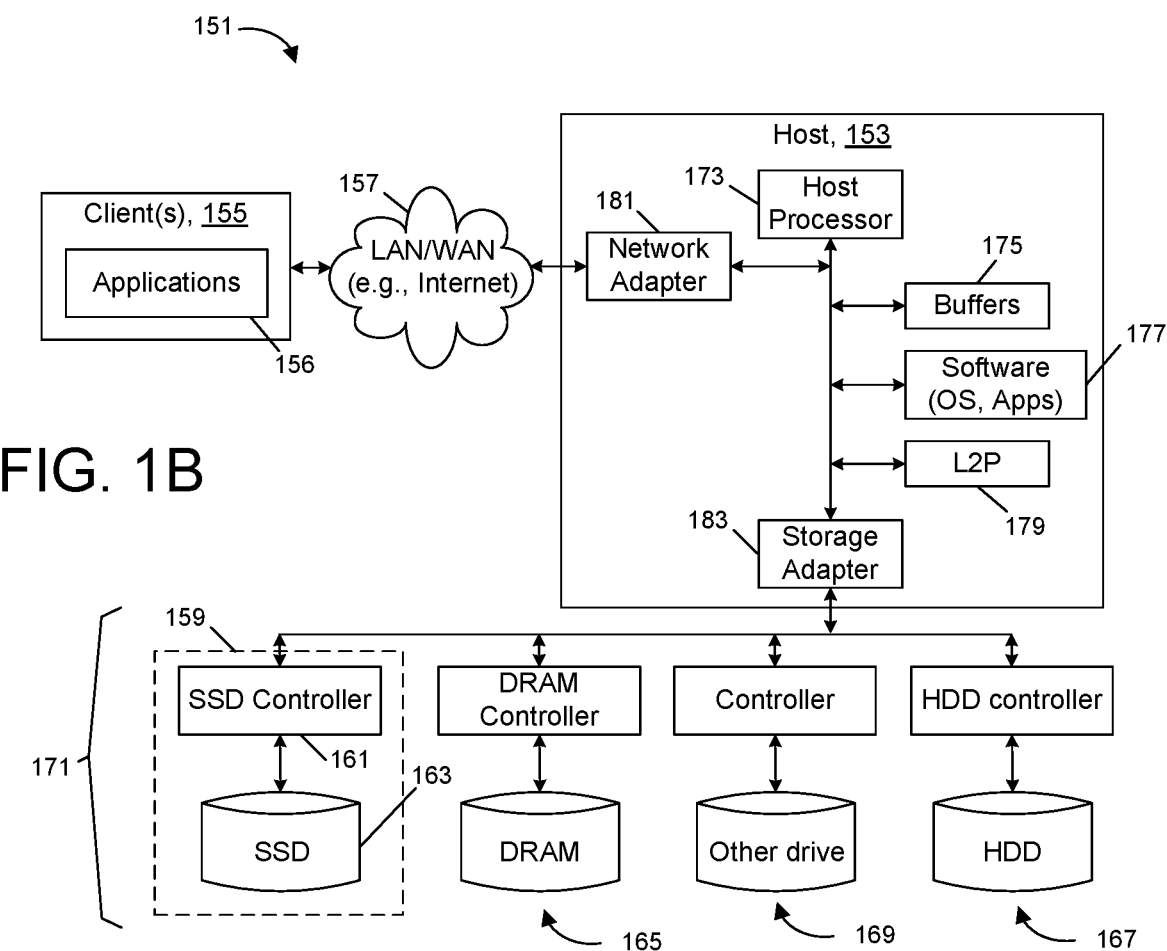
FIG. 1B illustrates a block diagram of a storage server having multiple solid state drives (SSDs) and hard disk drives (HDDs).

FIG. 1B illustrates an embodiment of a memory system 151. This system is seen to be a heterogeneous memory system having multiple storage drives. In this example, a storage server receives requests for data or to store data and, optionally, requests for processing that data from one or more clients 155. These clients 155 each have respective applications 156 which generate the respective data-related needs. The clients can each be desktop or laptop computers, smart phones, pads or other devices, or other types of digital systems. Each client 155 sends requests to the storage server and receives responses via a wide area network, e.g., a local area network (LAN) or a wide area network (WAN) such as the Internet. The storage server, in turn, manages plural drives, each of which can be an SSD (e.g., a flash based drive), a HDD or another type of drive; in such an example, the storage server 153 (acting on behalf of the clients) represents the host 153, as indicated in the FIG.; it is also possible that the clients can act as hosts as well, e.g., via direct memory access if supported. As seen in FIG. 1B, each drive also has its own dedicated memory controller, either bundled together as a single assembly 159, or as separate devices; for example, assembly 159 is seen to include a SSD controller 161 and a SSD 163. To simplify FIG. 1B, a dashed-line box to discuss this relationship is shown only for assembly 159. The SSD controller 161 can be a NAND flash memory controller and the SSD 163 can have one or more NAND flash memory devices. FIG. 1B also shows optional presence of other dedicate assemblies, 165, 167 and 169, in this case seen to include a DRAM drive or card, an HDD and another unspecified type of memory, respectively. The collection of memory is seamlessly managed as a storage aggregate 171, with the storage server managing scheduling for all drives so as to avoid collisions with storage-server-directed reads and writes, as described earlier. In this regard, the storage aggregate and the host 153 are bundled together to form the storage server, but this is not required for all embodiments. The storage server has a storage operating system that implements a file system to organize the stored data as a hierarchical structure of logical data containers (e.g., volumes, logical units, directories and/or files) on electronic and/or magnetic storage media. It will be understood by those skilled in the art that this description may apply to any type of special-purpose computer (e.g., file server or storage serving appliance) or general-purpose computer embodied as, or having, a storage server or portion thereof. The teachings of this description can be adapted to a variety of architectures including, but not limited to, a network-attached storage (NAS), storage area network (SAN), a disk assembly directly-attached to a client or host computer, or memory within a device (e.g., within a laptop or portable device), and FIG. 1B should be viewed as a proxy for such implementations.

The depicted storage server includes a host processor 173, which uses various buffers 175 under the auspices of the host software 177 to schedule and manage memory operations, including both memory transactions and memory maintenance operations. The host maintains a local L2P translation table so as to access files which can be fragmented in multiple memory locations and potentially multiple drives. The storage server also optionally employs policy-based space allocation, supporting data- and media-characteristic-aware data placement across the entire storage aggregate 171. The storage server communicates with the clients 155 via a network adapter 181 and with the storage aggregate 171 via a storage adapter 183 (although it is also possible to have all communications performed via network adapter or otherwise remotely over a network such as a WAN or LAN).

In some implementations, the client(s) can issue packets including file-based access protocols such as the Common Internet File System (CIFS) protocol or Network File System (NFS) protocol over TCP/IP when accessing information in the form of files. In other implementations, the client(s) can issue packets including block-based access protocols such as the Small Computer Systems Interface (SCSI) protocol encapsulated over TCP (iSCSI) and SCSI encapsulated over FC (FCP) when accessing information in the form of LUNs or blocks. Also in some implementations, the storage adapter includes input/output (IO) interface circuitry that couples to SSDs (169 and 165) and HDD (167) over an IO interconnect arrangement, such as a conventional high-performance Fibre Channel serial link topology.

In one implementation, the storage server is configured to access NAND flash memory, such as in drive 163 using physical block addressing, and to account for NAND flash memory-based device wear-out, and to execute garbage collection with associated valid data migration to manage NAND flash P/E asymmetry and other NAND flash management functions; this will be discussed further below, in connection with FIGS. 5A-10. The drive has a controller 159, as mentioned, which tracks metadata for every host-accessible memory write location, regardless of whether currently active or stale data is stored at the corresponding memory location or not. In one embodiment, the stored metadata includes wear information as referenced earlier. This is to say, assemblies 159 advantageously has a cooperative memory controller that stores state information and other metadata and makes this information available to the host upon request (e.g., via command interchange) or automatically upon certain predetermined conditions. The storage server can manage wear distribution across multiple drives to help lessen wear to any one area of memory; for example, in the context of the wear-aware writes, the storage server can collect wear metrics for all flash memory managed as well as for other types of nonvolatile memory, if present and if supported. The storage server can combine metadata from multiple drives and can allocate if desired new writes to a single drive only (and to a specific location within a single drive) if needed to better distribute wear or otherwise improve performance. As note earlier, in one embodiment, the host can preferentially store relatively hot data (e.g., young or frequently rewritten data) in one drive (or in a part of a drive) and can store relatively cold data (e.g., old or infrequently rewritten data) in a different drive (or a different portion of the same drive) in order to better distribute wear. In a second embodiment, the host can stripe hot and cold data (or other data based on individually-tracked metrics) across dies, devices or drives in order to improve performance. For example, if the depicted other drive 169 were a second SSD having flash memory, the host could allocate (within both flash drives, managed as a single tier) an equal distribution of hot and cold data destined for the flash tier in each drive; the same can also be performed within any given drive, e.g., SSD 163 might consist of multiple NAND flash chips, and the SSD controller 161 could perform this same striping entirely between integrated circuits within SSD 163).

Reflecting on the structures presented by FIGS. 1A-1B, FIG. 1A shows an embodiment where techniques described herein can be applied to a host, a memory controller, memory or any combination of these in a homogeneous or heterogeneous system; FIG. 1B shows an embodiment where techniques can be applied to in a host, a memory controller, memory or any combination of these in a heterogeneous memory system having multiple storage drives.

Figure 2B:
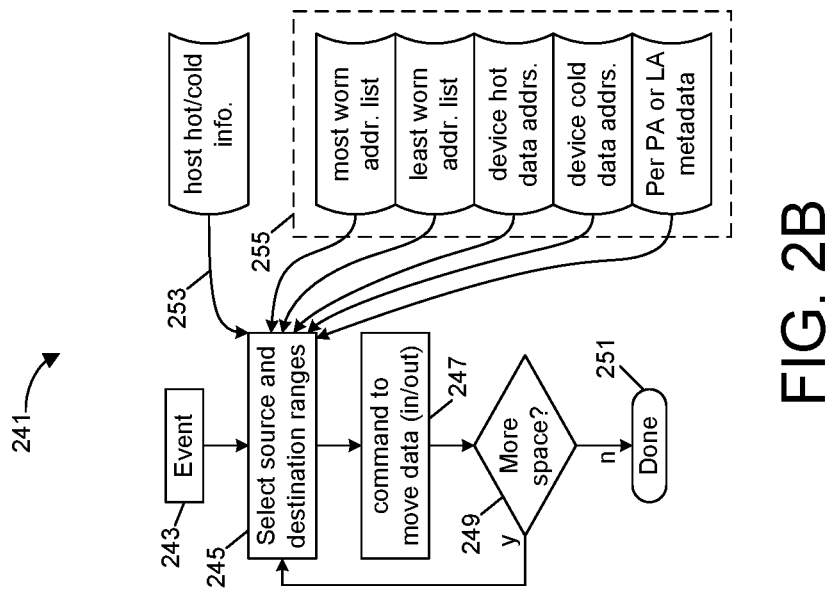
FIG. 2B is a flow chart showing one method of managing data based on per-data metrics and device wear.
Figure 2A:
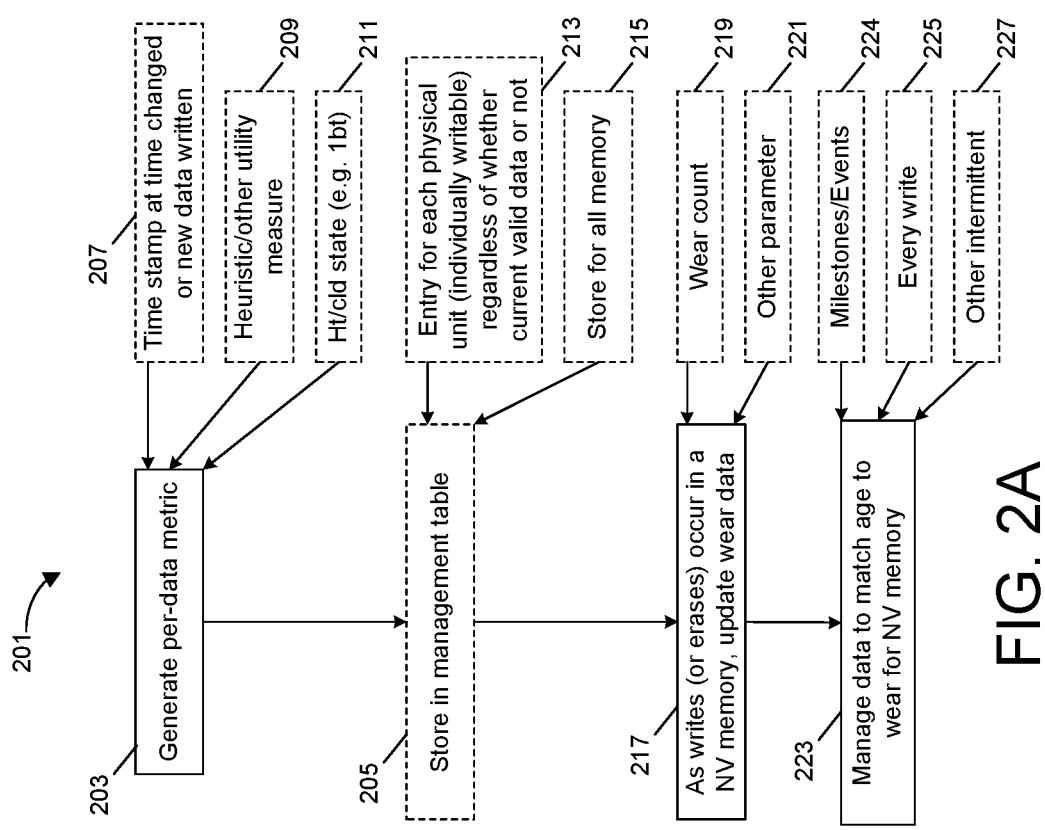
FIG. 2A is a flow chart that shows one method of managing data placement based on individual metrics tracked for respective data ("per-data metrics") and based on life cycle-based degradation metrics tracked for at least some memory locations.

FIG. 2A shows a flowchart 201 relating to some of the principles introduced above. In this embodiment, in order to track metrics (203) for respective data in memory, a host or memory controller stores or otherwise generates a value for specific data at the time that it stores or accesses data. In one embodiment, this metric represents age or a relative hot/cold or age value of the stored or accessed data. Many different types of metrics can be tracked or generated, depending on implementation. For example, in one embodiment, as noted earlier, a time stamp can be generated and stored for a particular unit of data or for a data file each time one or more values of that data is changed (e.g., per numeral 207); the older the time stamp, the older (and presumably less frequently overwritten) the data. Other units of measure (besides a time stamp) can also be used, for example a count, a month, a year, or some other arbitrary number or measure where varying values represent data age, data access frequency, expected data or rewrite write frequency, perceived importance of the data to system operation, or some other metric. Tracked age information that is set or reset upon writing of data is referred to herein as "age-since write" and represents one form of hot/cold data (i.e., where hot versus cold data in such an embodiment represents hot versus cold write frequency). For example, the value for this metric can in one embodiment be reset when data is changed (i.e., as to its values) and, in another embodiment, it does not have to be reset when data is changed (e.g., it can be defined as a time since corresponding data was originally written to memory, irrespective of value change). It is also possible to generate and/or track multiple metrics; for example, an embodiment will be discussed below where both data age and a data read frequency (expected or actual) are used to position data. As indicated in the FIG. by numeral 211, in one embodiment (e.g., discussed below, the information can be as little as one bit, e.g., for a hot versus cold relative state, and this information can be dynamically generated). It is still further possible to use statistical parameters or heuristics, per numeral 209. Note FIG. 2A indicates (205) that, in one optional embodiment, such metrics are tracked and stored in a management table for memory; such a table can be used to track data at a variety of different levels, for example, it is theoretically possible to track such a metric per-byte, although in a typical memory system, this small of a granularity would impose excessive overhead, and it will generally be more advantageous to track such a parameter by file, by logical or physical address of a chunk of data (or memory cells), or at another level of granularity. In one embodiment, such a metric is tracked at a granularity level equivalent to each writeable unit for NAND flash memory; thus, in such an embodiment, an age metric might be maintained for every "64 k" page of memory cells even if the memory system in question included DRAM in which data could be stored individually as smaller units of data. Such metrics can also be optionally stored at multiple data unit granularities for different memory tiers within a common system, e.g., for each physical page of flash memory and for each sector of a HDD. Note that if granularity level encompasses multiple sets of unrelated data (e.g., consolidated through garbage collection), that the value of the desired metric can be computed in a number of different ways. In one implementation, age-since-write adopted for consolidated data in a physical storage unit can be the set as the youngest age amongst the combined data. In another setting, a weighted average or an oldest age can be used. Clearly, many alternatives and permutations are possible.

Thus, reflecting on the foregoing discussion, metrics can be generated for each item of data stored in a particular storage system or subsystem (215). In one embodiment, a value can be generated on the fly (e.g., at time of eviction from memory and used for an ensuing write operation) and in another embodiment, a value can be generated, stored, and updated over time, retained as metadata corresponding to read/write data stored at a respective location in memory. Such metrics can be generated and/or tracked at the file level (e.g., in connection with a file name), or for a given size of data, for example, every logical page of data or for a "chunk" of arbitrary size. Such age metrics can also be generated and/or tracked per writeable physical storage unit (213), e.g., with an age metric for example retained per physical page of NAND flash storage regardless of whether currently valid data is stored there or not. If an age metric is tracked per-storage unit, techniques can be employed to identify a single age for unrelated data from different sources consolidated together at such a location, for example, based on a weighted average, or adopting the oldest or youngest age, whichever is desired for the particular embodiment. As represented by numeral 205, whichever level metrics are tracked at, the metrics can optionally be stored in a management table (e.g., indexed by chunk, file, physical subdivision or other unit).

In order to match per-data metrics to an appropriate memory destination, the host and/or one or more memory controllers also track wear for at least one tier of NV memory. Thus, per numeral 217, as writes or erases occur for that tier of memory, the host and/or a memory controller updates stored and tracked wear data to signify that wear has increased with the latest write or erase operation. Per numeral 219, this wear data can be in the form of a count, e.g., a write count or an erase count; once again, this information can be stored in a management table. It is also possible to use other wear parameters per numeral 221 (i.e., other parameters that are associated with the lifecycle of the particular memory location and, thus, the reliability with which that particular memory location can retain data). For example, bit error rate can be tracked per erase unit of nonvolatile memory and used to infer wear, e.g., with a unit that experiences high bit error rate being deemed "worn" and a unit that experiences low bit error rate being deemed relatively "virgin." Other factors such as temperature over time can also be tracked and used in a similar manner, e.g., with units subjected to a relatively high temperature over time being deemed "worn" and units subjected to a relatively low temperature over time being deemed "virgin." Any combination of these or other factors can also be used as measures of wear. Note that, in one embodiment, wear data can be maintained for more than one memory tier (e.g., for each of multiple tiers of NV memory or for all memory in a purely solid state system). Again, many variations are possible.

As indicated by numeral 223, the host and/or one or more memory controllers then match data to specific memory locations (e.g., to a wear within or bands of memory in a memory tier or across tiers) using the generated metric for the specific data and using tracked wear metrics. This process has a number of variations. First, as alluded to earlier, these metrics can be applied for new write data (or for data evicted from cache) to deem evicted data relatively "hot" or "young" and, so, write the data to a specific NV memory location having low wear. In a second example, introduced above, a similar process can also be used to evict data, for example, from a NV tier (e.g., from a flash memory tier) for relocation into a HDD or other tier. In yet another example, these metrics can be used to perform wear leveling or to consolidate data during garbage collection within a single memory tier. Other memory management methods are also possible, for example, one embodiment categorizes age of data and/or memory wear characteristics into "bands" or "bins," as referenced, e.g., a flash memory tier can be arbitrarily segmented into four categories separated by respective wear ranges (e.g., as established by comparison of wear counts for those locations with respective thresholds); data corresponding to a particular age category can then be matched to a wear category and stored in "any" memory location associated with the matching category band. Note that this example does not imply that the bands need to be of equal size or that a greater number of bands cannot be used. It is also possible to exactly match age to specific memory location wear of course, for example, by placing the oldest data (least frequently overwritten data) in the most worn memory location, and so forth. Other algorithms can also be used.

As indicated by numeral 224, data can be stored or remapped at certain trigger milestones or events. For example, one or more thresholds can be established and current conditions compared to such one or more thresholds to detect a condition; if such a condition is detected, action can be taken. At such time, both per-data metrics and wear data for nonvolatile memory can be employed to match the data to a location in memory. As examples:

(a) A host or memory controller identifies specific data that is mismatched to a current memory location, given its wear characteristics, i.e., the specific particular data is not suited for the current memory location; such data can be evicted and moved to a different memory location (in the same tier of memory or a different tier of memory, whether managed by the same memory controller or a different memory controller); note that identification of mismatch can be triggered for different reasons, including an eviction protocol or the need to obtain free space in memory, for example, cache memory;

(b) A host or memory controller for other reasons compares data from two different tiers of memory (i.e., where the data might ostensibly be already properly matched to storage location according to defined thresholds, see (a), above), but determines based on a comparison of the per-data metrics that a better solution would be to swap the data in question across bands or tiers of memory; to cite a simplified example, a first tier of memory might have wear tier matched to data having a value of a metric (e.g., age, hot cold status, etc.) less than a first threshold, and a second tier of memory might have wear best matched to data where the value of the metric greater than a second threshold (e.g., where each data could properly be stored in either location); in such a case, a host or memory controller could decide to swap otherwise suitable data to better align age the per-data metrics with wear traits for one or more memory locations;

(c) A host or memory controller identifies the need for a garbage collection operation and determines it needs to consequently consolidate unrelated data from diverse locations to a new location within NV memory; for example, in the case of flash memory, a hypothetical situation could exist where all pages in an EU other than a single page have been released, and where the EU in question is therefore eligible for erase provided the valid page is relocated; in such a case, a memory controller or host examines a tracked metric for this valid page ("first data") and then "finds" additional (second) data in memory with a similar characteristic, and it consolidates this data into a new EU destination having wear matched to the characteristic in question; when this operation is complete, a form of wear leveling will have been at least partially performed (by consolidating like data in a first operation, and then moving that data in a later section operation) as part of the garbage collection operation, thereby leading to more efficient memory utilization; and (d) A host or a memory controller identifies the need for a wear leveling operation in NV memory; such an event for example could be triggered by wear to one location in the NV memory that is significantly larger than another location in the NV memory (e.g., where disparity is greater than a threshold); the host identifies tracked metrics with respect to multiple sets of data, for example, an age-since-write (or some other measure of expected rewrite frequency or data persistence); the host relocates more resilient data to more worn memory locations and data expected to be of limited resilience (or to be overwritten more frequently) to less worn memory locations; note that in such an example, the host or memory controller typically need only process the extremes, i.e., very worn or unworn memory locations (relative to other memory locations) and very old or young data relative to other data stored in NV memory.

These use models are non-limiting examples only.

Note that these various techniques, depending on embodiment, can be practiced for memory managed by a single memory controller (e.g., by a flash memory controller managing single flash memory chip or IC), with management of migration processes being employed by either the host or the memory controller or both. For example, a single memory controller can perform wear leveling and, in so doing, assign data with low (young) age to less worn memory (or it can assign data with high or old age to more worn memory). These techniques can also be practiced across memory controllers managing different memories; for example, a first memory controller can determine that it has data that is excessively old or young (or otherwise is expected to have different persistence) and can send a notification of this fact to the host, which then reads the data in question out of such memory and writes this data to memory managed by a second memory controller. Such an operation can be initiated by host query (e.g., the host examines the need for data migration) or by a memory controller signal (e.g., one of the memory controllers detects an event such as a specific wear differential, and requests host intervention). Whether performed as part of a general system maintenance event or initiated by another condition, such triggers are generally encompassed by the milestones/events box 224 in FIG. 2A.

As denoted by numeral 225, these techniques can also be practiced in connection with a new memory write (i.e., for new data or for data being relocated from elsewhere); a host or memory controller examines a per-data metric that accompanies a data write command or it generates and adds a value for such a metric dynamically (e.g., it adds a "hot" value for data evicted from DRAM/cache under the presumption that such data has been updated more recently than data stored in NV memory, and is therefore presumed to be "hot" relative to data already stored in NV memory). Using such information, the data is targeted to a specific memory location dependent on age and wear of the specific memory location, e.g., less worn memory. In an alternate embodiment, if a metric indicates that the data is older than a threshold or is expected to be especially persistent, a write of that data can be directed by a host to relatively worn memory (e.g., NV memory or a specific tier of NV memory); as this reference implies, if there are many bands of wear ranges within a single tier of NV memory or multiple tiers of NV memory, data can be directed to each of these dependent on the per-data metric used by the specific implementation.

Finally, per numeral 227, these techniques can be practiced on another, intermittent basis, for example, with every passage of a period (e.g., a day, week, each power up), or at the same time as another system maintenance operation (e.g., the host or a memory controller examines per-data metrics for a set of data in connection with a defragmentation, erase, wear leveling or garbage collection operation affecting the same memory IC or memory tier).

FIG. 2B shows a flow chart 241 relating to another embodiment of a method of operation. An event 243 occurs, identifying a need for a data migration operation; such a need can be identified by either a host or a memory controller depending on embodiment. Per numeral 245, the host or memory controller as appropriate selects source data that is to be relocated and any pertinent destination address ranges. A command to move data is then generated; note that such command can in fact be a series of commands. For example, in one embodiment, a host commands a memory controller to transfer read data to the host, the host then writes this retrieved data by command to a memory controller using an address selected by the host, and the host then commands the erase of released space; the write can be issued to the same or a different memory controller, and the address specified for the write (and the erase) can be a logical address or a physical address depending on embodiment (i.e., even for NV memory such as flash memory using the "cooperative" schemes discussed earlier). In another embodiment, these commands can be performed entirely within a single memory controller (or practiced by cooperating memory controllers, i.e., multiple controllers, without host intervention). Per numeral 247, a decision then occurs as to whether the condition necessitating migration has been satisfied; for example, if the trigger was a garbage collection operation needed to ensure at least X free pages of memory (i.e., assignable for new, ensuing writes), then this decision would determine whether sufficient memory had been released and, if not, the process would loop and continue. If the condition is resolved, then the process terminates (251).

FIG. 2B presents an embodiment where multiple different sets of metrics are used to manage migration operations. First, numeral 253 refers to "host hot/cold data" as an example of a per-data metric tracked by the host. For example, in one embodiment, the host can track information on a per-file basis for data stored in memory representing expected data persistence; this information can be inferred using a heuristics approach as introduced earlier. Second, numeral 255 refers to data tracked by a NV memory controller; as indicated by the FIG., in this example, the memory controller stores information including a list of most-worn physical addresses, a list of least-worn physical addresses, a list of "hottest" data addresses and a list of "coldest" addresses (the latter two tracked by either physical or logical address, depending on embodiment). While in some embodiments, hot/cold data refers to write frequency (or expected data persistence), in a contemplated variation represented by this FIG., the hot/cold indication represents read frequency. For example, it was earlier referenced that at a system (or at a drive level), a memory controller managing multiple memory devices advantageously stripes data according to read frequency across each memory device to balance command traffic; FIG. 2B indicates that this can be done also using read frequency information stored by a memory controller (NV or otherwise), through the use of locally-maintained metadata and memory controller logic that permits the ranking of data according to read frequency. At the memory controller level in the depicted embodiment, this function is secondary to wear leveling, i.e., data is migrated within a single memory device if possible, and is migrated to a different memory device only if relative read frequencies indicate that one memory device or IC experiences disproportionately high or low traffic. These same techniques can optionally be used by a host as a factor in balancing traffic amongst multiple memory controllers or tiers.

FIG. 2C provides a flow chart 261 showing another embodiment of a data migration method. More specifically, as denoted by process box 263, the data is moved upward or downward within memory, i.e., within a tier or across tiers (e.g., to match data to a specific wear characteristics, or to evict data from a location based on a specific wear characteristics). "Upward" versus "downward" in this context refers to a hot/cold or persistence characteristic of respective data, age, or a similar metric. The migration can be based on a tracked wear characteristic, e.g., either degradation of a source of data to be migrated or degradation of a possible destination location. For example, one implementation could hypothetically search for data to be moved to a specific location in under-occupied NV memory. Such action can be taken upon detecting a trigger condition 271 (e.g., such as upon receiving an alert from a memory controller or in connection with a memory maintenance operation in some tier of memory). In such an embodiment, the host optionally performs all logical-to-physical ("L2P") address translation (265); as noted earlier, this activity is facilitated by optional use of at least one cooperative memory controller (267), which can provide status information to a host and other metadata with at most limited address translation overhead. Such a memory controller (e.g., for flash memory) will be further discussed below. Note that in connection with such a system, host commands, even those addressed to flash memory (or other NV memory) can directly specify physical address.

Per numeral 275, the host optionally compares age metrics from data from two tiers; as an example, the host can for a given tier identify the oldest data or most persistent data present in that tier, and then for the immediately ensuing tier (representing memory more susceptive to wear), can identify the youngest data in that tier, swapping the two as necessary. This task can be repeated until data age is well-matched to memory wear characteristics; hysteresis can also be applied, e.g., because memory swapping will also increase potentially increase wear of lifecycle-sensitive memory, the host can optionally limit swapping across tiers to situations where mismatch is significant (e.g., as determined by comparing age metric differences or wear differences to one or more thresholds).

Numeral 277 indicates processes performed for NV memory, tier n. First, data can be separated into an arbitrary number of bands or categories, for example, according to relative age, hot/cold status, expected persistence or other per-data metrics (279); again, this can consist of a multi-bit field or a single bit field (e.g., "hot" versus "cold"). If memory consists only of flash memory or other NV memory, typically there will be at least two such categories (relatively new data and relatively old or persistent data). Per numeral 281, the host or memory controller then retrieves wear data for storage blocks used for the data in question or corresponding to a possible or expected destination. The host or memory controller then optionally matches this metric for specific data to wear (283) and (as appropriate) determines if any data is stored in the wrong location (285), i.e., not matching a category or band. If data is deemed to be in the wrong location, a migration operation (287) can then be initiated, either by a memory controller or by a host command to one or more memory controllers as has previously been described. Note that as indicated by process 284, this determination can be performed as part of a data consolidation (e.g., a garbage collection) operation. For example, a host can read data from one memory, erase any freed memory location as appropriate, and can write the retrieved read data (e.g., with additional, like-age data) into a new memory location; it is also possible for a host to issue a delegated migration operation, in which a first memory controller performs all actions directly, on a delegated basis (including data identification and/or space assignment), or in a manner in which it sends data directly to a second memory controller for writing to memory. As indicated by optional block 289, the host can take other, related actions such as continuing or otherwise performing general wear leveling if wear variance within a particular tier still exceeds a threshold.

It was earlier mentioned that in one embodiment, a host can store tracked values for respective data, for example, age, hot/cold status, expected persistence, or some other metric. FIG. 3A shows an exemplary host table 301 used to store metrics by file. As seen in this FIG., the host maintains a virtual address table which it uses to find addresses in memory. The host performs this task by translating a virtual address, for example, specified by an operating system or software application, into a logical address, which it then uses to access a particular memory tier or device. Note that each entry, such as virtual address 1 (e.g., "VA-1") can relate to any file component, for example, the beginning of a file, or a part of a file, such as an index of file components, organizational information, header information, compression information, operands or other parameters, or any other desired file element. A single file (from a software application standpoint) might thus have several constituent elements, stored in contiguous or disparate address space. The host table 301 permits the host to locate the place where any given element is stored, and so to access the pertinent storage drive or other storage location. In this example, for any given virtual address table entry, the host is seen to store at least one metric ("metric" in the FIG.), which for example can be any of the values introduced earlier. For example, in connection with FIG. 3A, it can be assumed that the host utilizes a software application to estimate expected persistence of each file element. Many different factors can be looked at to determine this information, including the aforementioned example of a user rating for data in question, or last file access, or the frequency with which a related program (e.g., a music player) is called. There are a wide variety of different circumstances and other heuristics that can be examined for the purpose of analyzing expected utility of the file, component, parameter or other operand; many possibilities will occur to those skilled in the art, dependent on desired application.

Figure 3B:
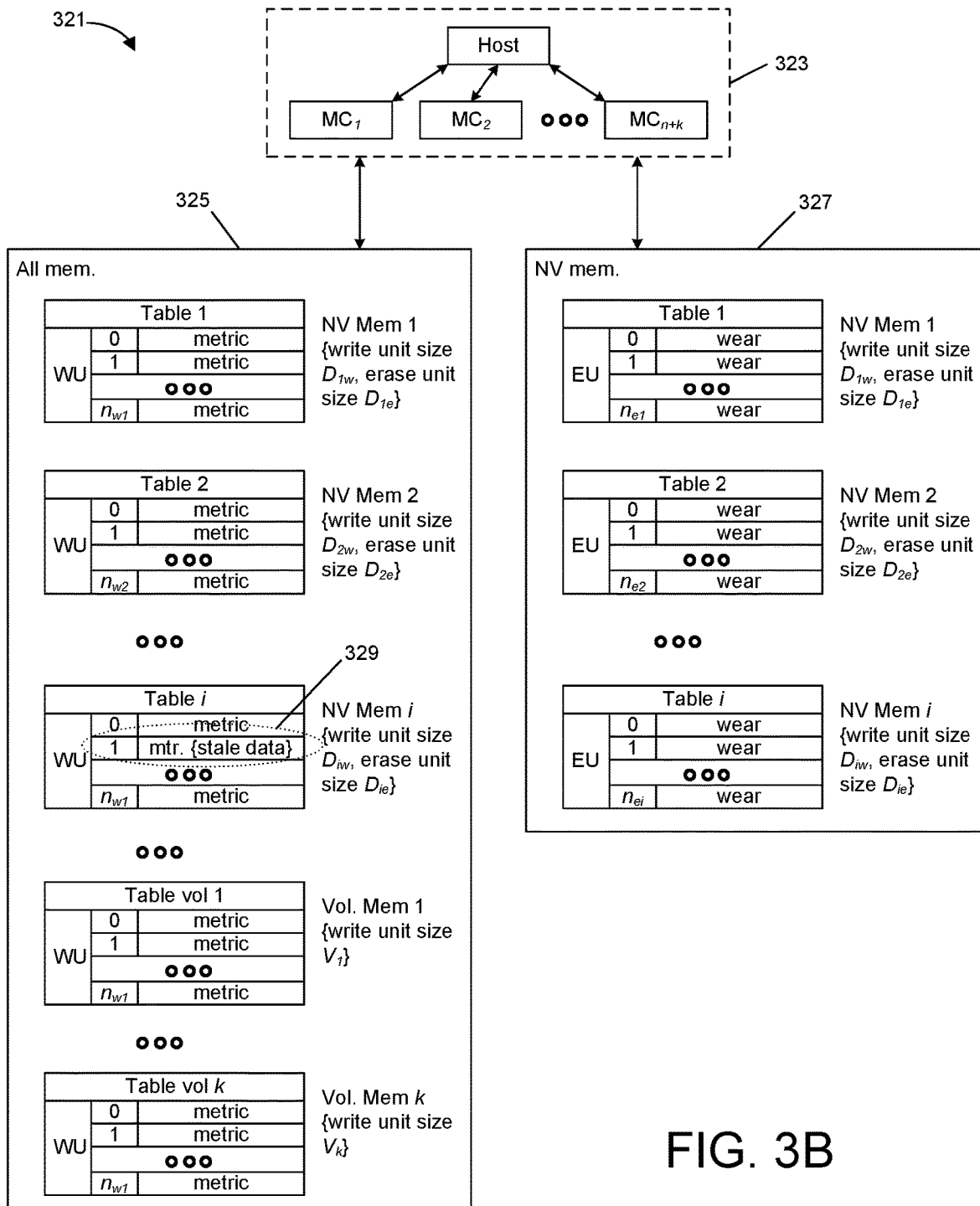
FIG. 3B is an illustrative diagram showing one form of per-data metrics and per-memory location wear for at least one tier of memory; these items are optionally tracked by the host and/or by one or more memory controllers and can be in addition to or in lieu of use of the table referenced by FIG. 3A.

As noted earlier in connection with FIG. 2B, in one embodiment, such host-generated information can be used together with other metrics tracked by the host or one or more memory controllers. FIG. 3B is used to give an example format for the tracking of these latter metrics; note that these latter metrics are optionally used without the table exemplified by FIG. 3A.

More specifically, FIG. 3B shows an embodiment 321 that manages data and/or memory according to the principles introduced above. This system is seen to reference a host and one or more memory controllers, collectively designated by box 323, one or more tables 325 that track per-data metrics representing a large pool of data (i.e., data that can be stored in different memory locations) and one or more tables 327 that tracks per-location wear for at least one tier of NV memory. FIG. 3B shows a table for each tier of memory (e.g., volatile, NV, etc.), but note again that this implementation is optional, i.e., embodiment disclosed herein include use models where data management is performed for a single memory tier tracked for wear irrespective of the presence of one or more other memory tiers. Note also that as used herein, a "table" can include situations where data is stored as an integral block of indexed entries, as well as where data is stored in respective buffers or dissimilar locations, as long as respective parameters can be accessed by the host or a memory controller (as appropriate). The left side of FIG. 3B (i.e., box 325) represents that, in one embodiment, per-data metrics are tracked for all data stored in memory irrespective of tier. In connection with data migration techniques presented by this disclosure, there is at least one tier of NV memory and all other tiers (such volatile memory are optional), i.e., i tables represents i possible different tiers of NV memory, and j represents j possible tiers of volatile memory, where i+k is ≥1 and i is ≥1. Although these tables are depicted as separate (e.g., maintained by a host for each tier of memory or by a respective memory controller), they can be combined into one large table (e.g., maintained by the host) and any given table can represent multiple different tiers of memory. These options are all represented by box 325. The right side of FIG. 3B (i.e., box 327) represents the general case where wear is tracked for each of j different tiers of NV memory, but again, tracking of wear for any tier more than one is optional; because there are i tiers of NV memory, there can be up to i tables maintained by a memory controller respective to each tier. Again, these tables can be combined into one large table (e.g., maintained by the host), and they can even be combined with the tables in box 325; for example, FIG. 3B also denotes a case where a host maintains one large table that for every host-accessible physical address stores metadata including age/persistence/hot-cold/or other metadata for valid data stored in a corresponding physical address location, and wear data for the corresponding physical address location irrespective of whether any valid data is stored there.

Note that the box 327 indicates that a "count" can be stored for each erase unit ("EU") of memory. In fact, wear can be tracked with other forms of metric than an erase count; any suitable metric can be tracked and used, as long as it represents a relative measure of lifecycle wear, degradation, expected lifetime, durability or a similar characteristic for the particular form of memory. Also, as noted, in a typical implementation, wear data tracked for a tier is tracked for each physical unit of memory that is available for storage of host data (i.e., each host accessible location) regardless of whether valid data is currently stored in such unit or not, i.e., an erased unit of NV memory for which wear is tracked typically will have a wear count (or other wear metric) associated with it; as referenced by numeral 259, per-data metrics can also optionally be tracked by physical address locations, e.g., with per-data metrics being retained for valid memory pages (i.e., in-use) as well as for stale data (corresponding to released pages in NV memory such as flash memory, where such stale data and associated metrics have not yet been overwritten).

In the embodiment represented by FIG. 3B, box 323 denotes that the tables referenced by boxes 325/327 can be made available to, and be used by, the host, a memory controller, a set of memory controllers, or any combination of the foregoing. For example, in one embodiment, such tables are tracked exclusively by the host. In a second embodiment, age tables are tracked by the host while wear is tracked by a memory controller that manages a specific NV memory tier, with wear data for specific memory locations made available to the host (i.e., upon host query for status of a particular memory location or when a prearranged condition is satisfied in connection with a memory command), or with addresses being presented to the host (e.g., where the host queries for memory locations matching a specific wear condition or when a prearranged condition is satisfied). In another embodiment, each memory controller tracks a per-data metric for all valid data stored in locations managed by that controller, and at least one memory controller managing a NV memory tier stores wear per host-accessible storage location for that tier. Per-data metrics can (again) be optionally stored and indexed by either logical address or physical address, depending on embodiment, as indicated. For example, in one embodiment, the host accesses memory by logical address, with certain memory controllers performing address translation (for example, as is common for flash memory controllers), and per-data metrics are tracked by either the host or the memory controller in connection with the logical address. In another embodiment, however, per-data metrics are tracked by physical address by either the host or memory controller, i.e., with per-data metrics kept as metadata associated with a physical unit of memory cells, and thus being linked to whatever data is currently stored in that location (or which was most recently stored in that location). One embodiment, disclosed below and by one or more of the aforementioned patent applications incorporated by reference, provides for a cooperative memory controller that performs either no address translation or limited (i.e., block address) translation, and provides host visibility into memory state as a function of physical address. In such an embodiment, the host can address data to NV memory (e.g., to flash memory) using physical address, with at best, erase block level reassignment (assuming the memory controller performs bad block management); either the host or the pertinent memory controller can track per-data metrics using the imputed or actual physical address. A cooperative memory controller architecture, especially useful for such an implementation, will be discussed further below in association with FIGS. 5A-10.

Figure 4A:
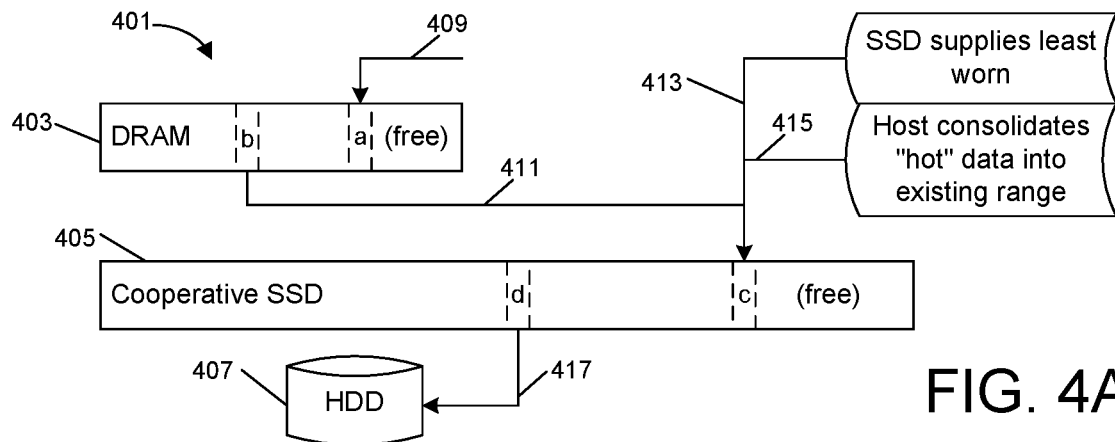
FIG. 4A is an illustrative diagram showing data migration methods that can be used for a memory system.
Figure 4B:
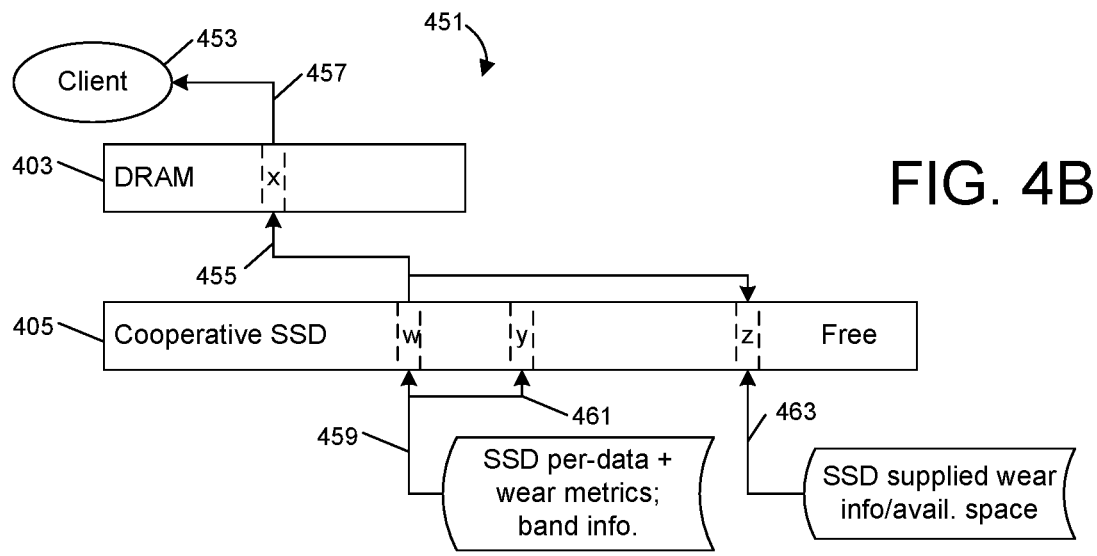
FIG. 4B is an illustrative diagram showing data migration methods that can be used for a memory system.
Figure 4C:
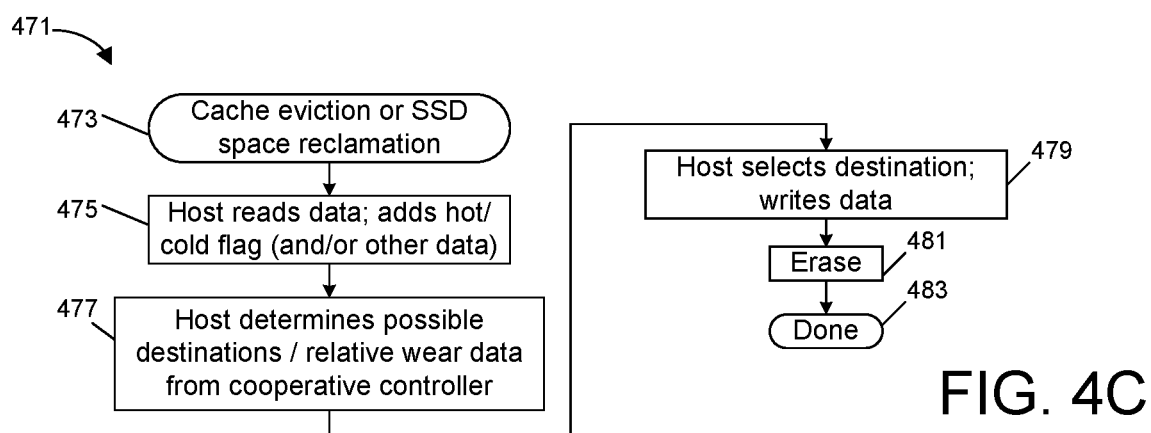
FIG. 4C is a flow chart showing data migration methods that can be used for a memory system.

FIGS. 4A-4C are used to introduce yet additional embodiments of data migration techniques. In connection with these FIGS., it should be assumed that there is a host, one or more memory controllers, and at least one tier of volatile memory (e.g., DRAM) and at least one tier of NV memory (e.g., flash memory), with other tiers optionally being present. More specifically, FIGS. 4A-4C help exemplify one possible embodiment where (a) a third, HDD tier is also present, and (b) the DRAM tier is used at least in part as an active cache memory, with writes being performed to the flash memory tier (the SSD) or the HDD only when data must be evicted. That is to say, the host retrieves data from SSD/HDD memory to service data requests from a client and as it retrieves that data, it stores the data for short term use in fulfilling other client requests. The "client" in this context can be a resident software application or operating system, or in an attached storage context (or the context of a server, data center or other type of system) it represents a request from a remote system. As more and more requests are serviced by the host, and more and more data is pulled into DRAM, the host runs out of DRAM space, and thus must write less-needed data back to a SSD or HDD. FIGS. 4A-4C presents a series of illustrative methods that can be applied to manage data flow in such a system.

FIG. 4A generally shows a tier eviction process, discussed in the context of a memory system 401 having a tier for DRAM (403), a cooperative SSD (405), and a HDD (407). Generally, a host will try to maintain a set of free buffers or memory space in each tier, and there are multiple methods with which to maintain this space. FIG. 4A shows an example where available space less than a set threshold will trigger an eviction from a tier or space reclamation process within a device.

Given this architecture, when a new write request 409 is sent to a memory controller for the DRAM tier (403), it will be written into a suitably sized memory space (a) within a free area of the DRAM tier. Available space is monitored by the host or memory controller which detects that the set threshold requirement has now been violated. An ensuing eviction process is then invoked (e.g., by the host or a memory controller, depending on embodiment) to locate the coldest item of data to evict to the cooperative SSD (405). The coldest data to be evicted in the DRAM tier is located in memory space (b); however, this data will be, on a relative basis, the hottest piece of data once written into the Cooperative SSD (i.e., via flow 411). [Note that in this case, the "per-data" metric can simply be, as alluded to earlier, a single bit of information indicating that the write arriving at the cooperative SSD (i.e., via flow 411) is cache-evicted; in other embodiments, this per-data metric can be tracked and stored, as indicated elsewhere, for example, by the host or the DRAM controller, via a management table, as discussed earlier.] The host then can select or designate to the memory controller for the cooperative SSD a least worn unit for writing of data (or alternatively, this can be transparently performed by the memory controller, depending on embodiment). This can be identified as memory space (c), for example, by the SSD memory controller as indicated by flow arrow 413. Alternately, the host can select free portions of already allocated EUs to consolidate the new hot data with existing data having a similar, tracked, per-data metric; this data flow is represented by numeral 415. [Note that such consolidation can optionally be performed just dependent on per-age metrics, e.g., the like-aged or like read frequency data may then later be re-matched to an EU having selected wear characteristics at a later time, via other processes.]

In the depicted system, the same or similar techniques can be used to evict data from the cooperative SSD. For example, if a set threshold of free space for the cooperative SSD is violated, the cooperative SSD can alert the host, which then selects the coldest data from the cooperative SSD (e.g., from memory space (d)) to evict from the SSD and to write into HDD. Note that different eviction processes can be performed depending on embodiment; for example, instead of evicting the "coldest" data from the SSD, the host can select data where access latency is least important or where read frequency is lowest. Other variations are also possible.

FIG. 4B shows several exemplary processes associated with tier migration or single tier management, i.e., in flow diagram 451.

When a client (453) requests of a data item from memory space (w), the host may determine that data is stored on the cooperative SSD (403), and read it into DRAM (405) at memory space (x), (per flow 455). This data will ultimately be provided to the client by process 457. At the time the data is written into DRAM, the data is "hot" from the standpoint of read frequency, but of course, the data may still be persistent and suitable for storage in the SSD. However, since the data in question is at least temporarily held DRAM, this "second copy" provides an opportunity for the host and/or the cooperative SSD to perform optional management affecting memory space (w), since this will not affect coincident reads or writes which can be serviced using memory space (x) as an operand.

A number of different processes can be performed.

For example, in one embodiment, the host (or SSD controller) can use this redundancy to perform migration or space consolidation operations affecting the redundant data. That is, based upon data from the cooperative SSD, the host can migrate data from memory space (w) to consolidate it with other data of like activity (hot/cold), e.g., in a partially available EU corresponding to memory space (y) or can move the data off to a memory space (z) selected from available (free) memory space in the SSD, matching that data with a unallocated EU of appropriate wear; these operations can also be combined. The tracked wear and per-data metrics, e.g., stored by the cooperative SSD controller as referenced by flows 459, 461 and 463 can be used for these processes. Note that, as with other processes discussed here, the host can also migrate metadata as appropriate for relocated data, for example, by swapping metadata pointers (e.g., the only the references are moved, not the metadata), or by moving table entries, such that per-data metrics follow the associated data; in one embodiment, this is performed using a copy operation that leaves old per-data metrics in place (which is thus rewritten when new data and associated metadata are committed to the particular page/EU location).

As noted earlier, in some embodiments, as referenced earlier, wear leveling can be performed, with hold/cold (or old/young, or persistent/temporary) data being re-matched to other memory locations. While not necessarily associated with a host read of data, such operation is also exemplified with reference to FIG. 4B. For example, the cooperative SSD can identify that data at memory space (w) would be better consolidated in memory space (y) with existing data, or re-matched to a new, available EU, at memory space (z). This determination could be based on supplied wear data for any of memory spaces (w), (y) or (z), or all of them. The cooperative controller in one embodiment can perform this process for each of multiple data items, by comparing per-data metrics and source and/or would-be destination wear data with thresholds or with similar metrics for other data, and shuffling data storage locations. In one embodiment, the cooperative controller identifies "bands" of storage locations according to wear, as indicated, such that different data can be moved to any of a number of available storage locations (already partially occupied or completely free) depending on whether per-data metrics match a particular wear "band." It might be determined for example, that data form memory space (w) can be consolidated into memory space (y) with other data having similar per-data metrics, while memory space (z) is reserved for other data having different per-data metrics. Many variations are clearly possible.

FIG. 4C presents a flow diagram 471 associated with some of the processes just referenced. As depicted, when data is evicted from cache, or when the SSD is to be processed for space reclamation (or e.g., to perform wear leveling), the host reads the data in question along with associated per data metrics (and generates this information on the fly, as appropriate to the embodiment, per numeral 475). The host determines possible destinations for the retrieved data, and considers wear data from the cooperative controller, per numeral 477. The host then selects a destination, writes data to the selected destination, and updates stored metadata, as appropriate (per numeral 479). Finally, the host issues an erase command (481) and terminates the process (483).

The above-mentioned embodiments are intended to be illustrative rather than limiting, and not doubt other use models and applications will readily occur to those skilled in the art.

The description below introduces specific techniques for cooperative interaction between a NV memory controller and host. Note that in a heterogeneous system, these techniques can be employed by a single memory controller (e.g., to interact with the host in a manner that streamlines host interaction with other memory controllers or tiers of memory). These techniques represent one, optional memory controller design, and are not required to implement the data management or migration techniques referred to above. Generally speaking, a cooperative memory controller for NV memory stores information specific to each of plural subdivisions of memory, and makes data based on that stored information accessible to the host to assist with host management of memory, as needed. The host can use this supplied information to manage operations with memory, so that memory controller functions can be selectively commanded by the host in a manner that does not collide with host data read or write requests.

For example, a cooperative memory controller can store a table with information or metadata for each host-accessible logical unit or physical unit spanning the entire memory managed by that controller. This metadata (exemplified below with reference to FIG. 9) can be used to send alerts to the host (for example, when the memory controller has run out of previously-erased space to assign to newly arriving host write requests or another condition arises), or to service host queries for status information about any particular host-accessible memory location. This is to say, as will be shown below, in one embodiment, a cooperative memory controller includes various logic elements (e.g., circuitry or hardware logic, and/or instructional logic) that permit the memory controller to operate in various different modes and service host queries for various types of information. Such a memory controller can be operated in a synchronous mode (i.e., it services host queries on demand) or an asynchronous mode (i.e., the host programs a state where the memory controller alerts the host only when a condition programmed into the memory controller by the host is reached). The information responsively provided to the host can be the stored metadata or status information itself, or the result of processing or filtering performed by the memory controller based on that information (e.g., a list of addresses or a single address meeting a host-specified condition). Note that the information provided responsive to host query differs from stored write data, i.e., it represents status of the memory cells themselves (irrespective of any specific bit values stored in the host-accessible memory location) or information regarding tracked metrics for the data stored in the location (e.g., such as hot-cold status, also irrespective of the particular stored data bit values). Once in receipt of the information stored by or tracked by the cooperative memory controller, the host then can electively take or schedule action in dependence on that data (e.g., such as commanding migration operations, as introduced earlier).

The stored information maintained by such a memory controller can include one or more fields of metadata representing each erase unit (EU) or physical page of a flash memory. Examples of data that a memory controller could provide to the host responsive to this data include (i) extent to which a set of constituent pages of a particular EU have been released, (ii) a list of unerased EUs in order of amount of stale space (e.g., candidates for space consolidation), (iii) data representing frequency of individual page or EU usage, and (iv) the metadata referenced earlier; naturally, these examples are non-limiting. Note that a host within this context can be any integrated circuit or other apparatus (e.g., such as virtual or actual machine) that transmits a request to the memory controller for some type of processing or response. In one embodiment, the memory controller has interface logic that permits a host to request any of these pieces of information by issuing respective commands. To provide an example of an action a host could take based on this exemplary information, in one embodiment, a host armed with this information can issue an erase command directly addressed to a specific EU of memory (i.e., where the erase command specifies not a logical location that will be translated by the memory controller into a true location, but rather directly specifies the physical memory unit to be erased). Similar examples exist for data migration, garbage collection, space reclamation, wear leveling and other memory management functions.

Note also that that this infrastructure can be employed to substantially eliminate the need for a flash memory controller to implement a flash translation layer (FTL). That is, a flash memory controller can maintain per-subdivision data, which is accessible to the host (e.g., retrievable by, or against which the host can issue function calls or queried). The host uses this information to issue new write commands that are targeted to specific physical locations in flash memory, thus substantially avoiding the need for translation at a memory controller, and reducing the likelihood of uneven wear. In addition, the host receives alerts, and issues queries as necessary, to ensure that it is generally apprised of events that signify the presence of excessive wear, excessively cold data, excessive "released" space and low available memory space and so forth. This information is then advantageously used in host-dictated scheduling of maintenance operations in flash memory, such that those operations do not interfere with writes and reads needed by the host. To provide one optional implementation illustration, in a storage aggregate having multiple storage drives, maintenance operations can be scheduled by the host for a first drive (and delegated to a memory controller for that drive) while the host is occupied with transactions directed to a second drive, i.e., the maintenance for one drive is "stacked" behind operations in another.

Note that as stated, this infrastructure can "substantially" eliminate the need for an FTL on a flash memory controller; in one embodiment, a memory controller attempts to write data, detects a failed write attempt (for example, using a maximum number of "PV cycles" introduced previously), and transparently redirects the write to a new memory location. In such an optional implementation, the cooperative memory controller "moves" the entire EU at issue, preserving page distinctions, to a new EU, and marks the block in question as bad; in the metadata storage areas for the bad block in question, the cooperative controller stores redirect information identifying the new unit. Thus, when a host read request comes in for data that was moved, the cooperative memory controller need only identify the new EU where the data is located and perform a limited redirect (i.e., at the same page or other address offset). As wear leveling is performed over time, or as other status updates occur, the host is informed of the failed block identity, and thus bad blocks are effectively ignored by the system, with garbage collection, defragmentation, wear leveling and other processes effectively leaving bad blocks behind in favor of migration to physical address used for all purposes.

Employed in the context of flash memory, these techniques can help reduce flash control bandwidth competition with host-initiated reads and writes and can help minimize write amplification. These techniques, in turn, can help substantially eliminate the need for an FTL as conventionally used, which leads to further efficiencies. By redefining host and/or controller responsibilities, host-controller management features duplication and associated disadvantages can also be avoided, leading to a simpler and less expensive memory controller design.

For example, these techniques facilitate better pipelining of commands in flash memory systems. In an implementation where there is no FTL table that must be loaded into a flash memory controller, and no associated search tree, flash memory is capable of servicing host read requests more quickly. The reduction of write amplification and controller-initiated erase, wear leveling and garbage collection operations reduces unintended competition with host-initiated commands, i.e., the host is far less likely to find flash memory "busy" when it seeks to have a command filled, because the host is vested with scheduling of the potentially competing functions. In turn, the better pipelining permits a host to more easily interact with a storage aggregate having one or more discrete flash drives, optionally including other types of storage drives (i.e., mixed or non-homogeneous memory).

The described cooperative infrastructure also facilitates a condition where the host performs all (or at least a substantial part of) logical to physical (L2P) address translation. The host stores a L2P translation table; when the host has a need to issue a command to memory, it performs translation and directly addresses specific storage units in memory. In this manner, a memory controller (e.g., a flash memory controller) does not need to perform local address translation that might add latency in responding to host commands.

While the described cooperative structure is exemplified here with respect to a flash memory controller (e.g., the SSD controller 161 from FIG. 1B), these techniques can generally be extended to other memory controllers for respective memory tiers as appropriate; for example, a similar controller structure (e.g., with support for program-erase asymmetry) can be applied for a shingle-drive storage format, or other form of NV storage tier. It is even possible to apply some of these teachings to some of the volatile memory forms discussed earlier.

As noted above, a cooperative memory controller can tracked many different kinds of metadata per host-accessible storage location; without limitation, this information can optionally include one or more of:

whether the respective subdivision has been marked as bad;

whether a memory operation is currently in progress in the respective subdivision;

number of erase operations performed on the respective subdivision;

a period since data was last programmed within the respective subdivision;

number of reads to memory within the respective subdivision since last erase;

a logical address for data stored in the respective subdivision;

a number of pages released within the respective subdivision;

a number of pages used within the respective subdivision;

information representing page usage for all pages within the respective subdivision;

whether the respective subdivision has been programmed out of order relative to others of the plural subdivisions; or whether the respective subdivision has been assigned to defect management.

Other types of information can also be stored by a memory controller, for example, data age, hot/cold status, information regarding data persistence, or other forms of metadata.

In one contemplated implementation, i.e., for a SSD drive having NAND flash memory as referenced, each subdivision is an EU or page of NAND flash memory, and a NAND flash memory controller can provide a map to the host indicating relative information (e.g., page utilization) for all subdivisions of the specific drive or a storage volume spanning multiple drives. Alternatively, the flash memory controller can provide filtered or derived information based on such a map to the host, for example, a listing of EUs best suited for space consolidation based on some threshold applied by the flash memory controller. Such a threshold can be defined as a default and/or can be dynamically programmed by the host (e.g., by asynchronous command).

Figure 5A:
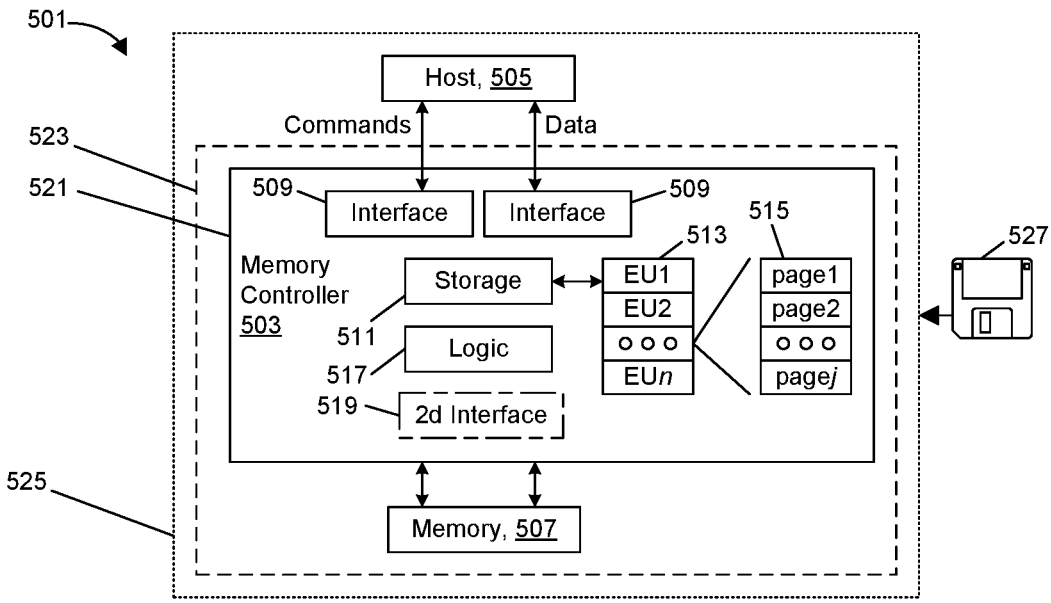
FIG. 5A is a block diagram of a memory controller.

FIG. 5A illustrates a first embodiment of a storage system 501 having such a memory controller 503, a host 505 and memory 507. In the illustrated embodiment, the memory controller is structured to cooperate with the host 505 in the control of the memory 507. The memory controller 503 has at least one first interface 509 to exchange commands and data with the host. Although two such interfaces and corresponding transmission paths are seen in FIG. 5A, these interfaces may be combined (e.g., with communications occurring via a packet-based transmission scheme). The commands generally relate to operations in memory such as read and write operations, although commands can also be directed to the memory controller 503 to assist in memory functions. In one embodiment, the commands and signaling protocol are compatible with one or more standards, for example, with Non-Volatile Memory Express (NVMe) or the Small Computer System Interface (SCSI) (in the case of commands) and Peripheral Component Interconnect Express (PCIe) or Serial-Attached SCSI/Serial ATA (SAS/SATA) (in the case of signaling formats). The memory 507 generally has an array of memory cells and array control circuitry that may support one or more planes or banks depending on design. The memory core in turn has one or more subdivisions of memory cells for which subdivision-specific usage data will be tracked by the memory controller 503. In embodiments where the memory is flash memory and the memory controller a flash memory controller, each subdivision can include one or more erase blocks or units (EUs), with each EU having a minimum number of memory cells that must be erased at once.

The memory controller tracks subdivision-specific-usage data using internal storage 511. In one embodiment, this storage can be volatile memory such as synchronous random access memory (SRAM); in another embodiment, this storage can be non-volatile memory, for example an internal flash array. As denoted by reference numeral 513, the storage retains information for each subdivision of the memory governed by the memory controller, in this case, for a physical subdivision of the memory 507. In embodiments where the memory 507 is a NAND flash memory, the storage retains information for each EU or physical page of the flash memory (e.g., EUs 1-n as indicated by reference numeral 513). Note that for flash memory, each EU can also correspond to multiple pages, as indicated by numeral 515 (e.g., pages 1-j). For example, depending on manufacturer and design, there can be 128-256 pages per EU, with each EU corresponding to a substrate well, and each page corresponding to an independently controlled wordline for memory cells tied to that substrate well. The memory controller also has logic 517 that is operable to send to a host either some or all of the "raw" information retained in the storage 511, or derived or processed information based that storage 511. This logic for example can include circuitry within the memory controller that is adapted to respond to host commands seeking specific data; alternatively, this logic can also include circuitry that applies pertinent filters or comparisons and that notifies the host when a tracked metric meets an assigned threshold. This information or an alert representing a particular condition can be transmitted to the host via the at least one first interface 509, via a dedicated connection or via a backplane connection.

Several configurations are also represented by the embodiment of FIG. 5A. First, as represented by numeral 521, the memory controller 503 can be designed as a standalone integrated circuit with the host 505 and the memory implemented as one or more discrete integrated circuits (e.g., the host in the form of a host processor). Second, as represented by dashed-line box 523, the memory controller 503 can instead be co-packaged or otherwise combined with the memory 507 as a storage subsystem. For example, dashed-line box 523 can represent a discrete solid-state drive (SSD) where the memory controller is implemented as an IC and where the memory is embodied as one or multiple NAND flash devices. It is also possible (as represented by dotted-line box 525) to combined the memory controller 503, the host 505 and the memory 507 as a single system, for example, a network-attached storage system or a storage system adapted for connection with another digital system (e.g., via a USB, PCIe, SATA, Ethernet or other standard signaling protocol). Finally, as represented by reference numeral 527, cooperative management functions can be embodied as instructions stored on non-transitory machine readable media, for example, for use in controlling a host processor, memory controller or other circuit. That is, software or firmware can be used to control actions of a host, memory controller or other circuits.

Figure 5B:
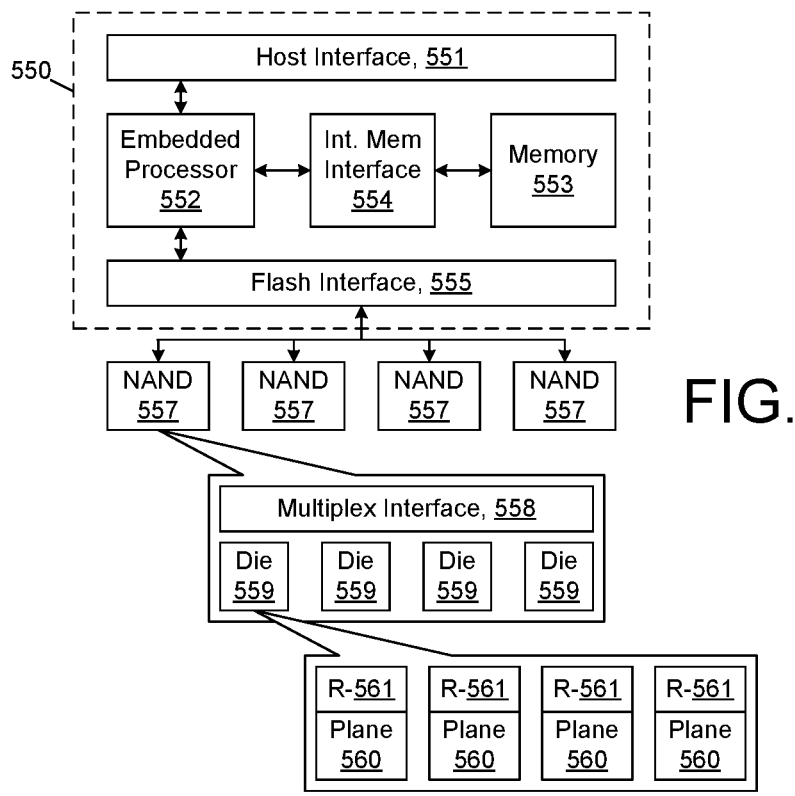
FIG. 5B is a block diagram of another memory controller.

FIG. 5B shows a solid-state drive (SSD) having a memory controller 550 and NAND flash memory comprising one or more NAND flash memory devices 557. The flash memory controller 550 includes storage to store information for each subdivision of memory as referenced above, as well as logic that services host commands relating to that information. The logic is partially in the form of an embedded processor 552, which receives commands from the host and fulfills those commands under the auspices of firmware. This logic and firmware will be further exemplified below, but for purposes of FIG. 5B, it is noted that this logic relies on internal memory 553 including volatile storage (e.g., DRAM, or another very low-latency storage technology, for example, using a double-data rate or "DDR" signaling scheme) and nonvolatile storage (e.g., internal flash memory for the firmware). The memory, and associated firmware and data, are accessed via a dedicated interface 554. Once again, in one embodiment, the flash memory controller interacts with a host using exchanges of commands and data that are compatible with one or more well-known communication standards, such as NVMe or SCSI. Each of these standards provide for commands to be sent from an initiator (such as the host) to a target (such as a storage device). Signaling formats used by these commands structures can follow any desired signaling standard, for example, a version Peripheral Computer Interconnect Express (PCIE), serial ATA (SATA) or another signaling standard. The interaction can take the form of commands for memory transactions (e.g., read and write transactions), configuration commands to the memory controller (e.g., asynchronous commands), query commands (e.g., commands for synchronous or asynchronous returns of information based on memory controller processing requested by the host), and alerts and returns of various operating codes and other information from the memory controller. Generally speaking, a "synchronous command" as used herein will refer to a command to the memory controller which initiates a function in the memory controller that returns a result as soon as processing is completed. A synchronous command is analogous to a query. An "asynchronous command" as used herein will refer to a command that requests a return only once another condition is satisfied. Such a return of information can be triggered immediately (e.g., if the condition is already satisfied) or in the future (e.g., the memory controller alerts the host immediately and without solicitation when a condition specified by the host is later satisfied). An asynchronous command can be thought of as the host setting an operating mode or condition in the memory controller, e.g., setting a mode calling to trigger an immediate alert if and as previously released space exceeds a host-specified level.

To perform input/output (IO) operations, controller firmware interacts with a low-level flash memory interface 555 to translate high-level IO commands into flash memory operations. In this embodiment, the flash memory consists of one or more NAND storage devices (e.g., integrated circuits) 557, each coupled to the flash memory interface 555 via a multidrop channel. Each device 557 includes a multiplex interface 558 that connects to one or more co-packaged dies 559. Each die can have one or more planes 560, each with independent control and data registers 561, so that each die is capable of performing multiple IO commands simultaneously (e.g., an operation for each plane). These registers and respective planes can be delegated commands (e.g., programming commands) by the memory controller, or alternatively, the memory controller can use a fractional programming scheme. Following SCSI protocol tradition, a logical unit (LUN) is used to refer to the smallest device unit addressable by IO operations.

As mentioned, the controller can serve detailed information to the host for each subdivision of memory, and the host can also issue query requests to the memory controller, designed to assist the host with management of the bandwidth-consuming functions referenced above. Advantageously, to avoid delays associated with memory-controller-resident address translation, the host sends IO requests to the memory controller that directly specify physical address. Note that for a NVMe compatible embodiment, the predicate of direct physical addressing can be supported simply by configuring the memory controller to manage the host-specified address as a physical address, or otherwise with limited memory-controller-side address translation. The performance of commands (e.g., management of multiple program-verify cycles, or "P/V" cycles, of one write command) is then managed by the memory controller which alerts the host upon command completion. The meaning of the physical address in this context depends on flash memory geometry but, in this embodiment, includes multiple fields. These fields can identify for example the number of a communication channel within the flash memory interface 555, the number of a device 557 connected to that channel, the number of a die 509 within that device 557, the number of a plane 561 located on the die 559, the location of a block within the die 509, and the location of a page within the block. Thus, physical address in this embodiment includes a quadruple of channel, device, die and logic unit number (LUN).

It was earlier mentioned that, in one embodiment, a host and/or memory controller can track read frequency to balance traffic between different memory devices or ICs. FIG. 5B represents such an embodiment, i.e., each NAND IC 557 can be balanced for traffic, with hot and cold read frequencies striped across all devices 557; such balancing can also or instead be applied by the memory controller across dies 559 for any given device 557 or across all devices. Information about a supported number of planes 560 for any given memory die can also be taken into account by the host and/or pertinent memory controller in scheduling data migration, i.e., typically all planes corresponding to an EU must be erased together and will have similar wear.

Figure 6A:
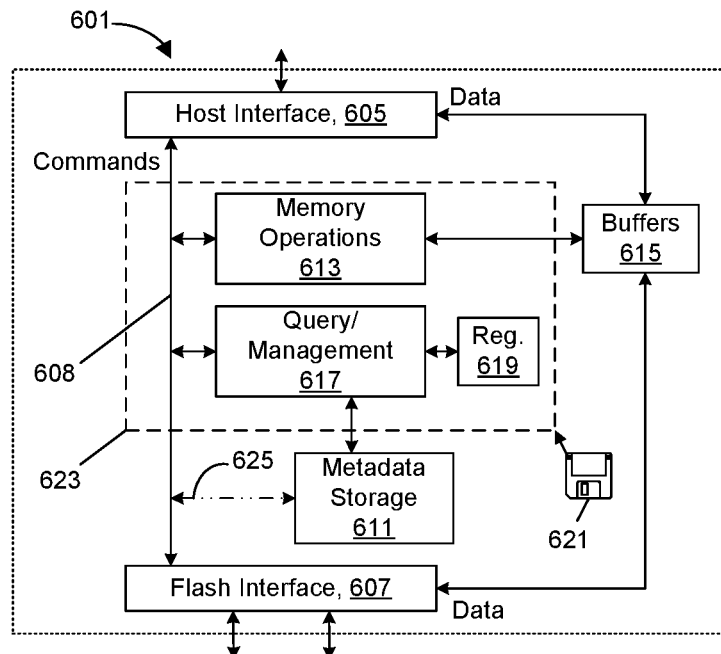
FIG. 6A is a block diagram of a memory controller.

FIG. 6A helps illustrate layout of another cooperative memory controller embodiment, with an emphasis on command processing. In particular, a flash memory controller can be implemented as a single integrated circuit 601. As before, a host interface 605 is used to exchange commands and data with a host, and a flash interface 607 is used to issue commands to and exchange data with one or more flash memory devices (not shown in FIG. 6A). Note that in this embodiment, a single path is illustrated as coupling the memory controller with the host, for packetized exchange of both commands and data; that is, the host interface can include logic that extracts commands and data from request packets, and can also packetize read data, alerts, metadata and other communications to the host. Other implementations are also possible, for example, using separated command and data busses. In the scheme depicted in FIG. 6A, it should be assumed that the host interface has a high speed serdes interface, such that communications with the host occur over one or more differential signaling paths, for example, compliant with a PCIe, SATA or other signaling scheme. Note that one or more flash devices can be copackaged with the memory controller, and thus the flash interface 607 does not necessarily have to use the same signaling scheme as the host interface, e.g., communications can be via wide-bus single-ended communications, using command and data busses.

The host interface 605 separates controller commands from any received packets (as necessary), and routes these commands over a command bus 608 internal to the flash memory controller. Generally speaking, commands will relate to memory operations (e.g., reading or writing of data) or to queries for data and memory management functions. To this effect, separate logic blocks within the memory controller are dedicated to each of these functions.

A memory operations logic block 613 manages operations involving the memory device. For example, as is well-known, NAND flash memory typically utilizes incremental programming—that is, array control circuitry for the flash memory device uses a minimum programming voltage, and results of programming are checked against contents of a write data register to determine whether those results are correct. This is performed using a "program-verify" (P/V) cycle having separate "program" and "verify" phases as referenced earlier. During validation, a programmed page is typically sensed and an exclusive-or function is performed with contents of the write data register; for any bits that remain set, programming has not been effective, so the programming voltage is raised and the process repeated in a second P/V cycle. This process typically continues until proper programming has been achieved or some limit has been reached, the latter case resulting in a write error. The memory operations logic block 613 performs control over these various phases of programming using buffers 615. Since a memory device can include multiple planes (as discussed above), the memory command processing logic block 615 optionally uses multiple buffers, for example, with one dedicated to each plane or with buffers assigned on a rotating basis for individual commands received from the host. The memory command processing logic block also manages any functions of reporting write error and consequent remapping of data, as well as updating L2P mapping information in metadata storage 611 (for embodiments that perform such mapping). Note that this information can be part of a much larger class of metadata indexed by EU as discussed above (see, e.g., FIG. 6 and the accompanying discussion below for examples on types of information that can be tracked using this storage).

Commands relating to the return of query information (e.g., synchronous commands) or the setting of an operating mode (e.g., asynchronous commands) are sent to query/management logic block 617. Generally speaking, the host can request (a) return of raw information for the entire memory space managed by the memory controller, or for specific address ranges or EU ranges, or (b) processing or filtering of that data by the memory controller. For example, as referenced previously, the memory controller can be provided with logic operable to receive and interpret host commands for lists of blocks, e.g., the "top ten" candidates for garbage collection, ranked in order of page (under) utilization. Since the purpose of such an operation is to identify EUs for erasure, a memory controller receiving such a command interrogates the metadata storage to (a) identify EUs that are at least partially in use, (b) identify the extent of page utilization for each such EU, and (c) order a set of EUs that are candidates for erasure in the order of greatest number of released pages. The query/management logic block 617 uses internal registers 619 to manage functions like this and, when the requested processing is complete, the query/management logic block sends a reply message to the host with the requested information. Note that the host interface 605 includes buffers that receive this data, and queue the data for transmission to the host (e.g., as a reply packet that may be distinguished from read data). The mentioned example is only one type of query that can be processed by the host, i.e., there are many types of requests and queries that can be processed by a memory controller, for example, queries related to wear metrics and/or persistence, age, hot-cold, or other types of information. For example, as referenced previously in connection with FIG. 2B, a cooperative memory controller can track hot/cold data and can identify associated logical or physical addresses, and can sort and provide prioritized lists to a host (e.g., top ten "hottest" logical address pages in terms of read frequency, or top ten least or more worn EUs or physical pages in terms of wear); such a memory controller can even identify wear for memory locations corresponding to data having a specified logical address, and directly sort physical location wear indexed by logical address of data. A skilled designer can implement any type of management processing desired. This request is an example of a synchronous query, because data is on-hand for the memory controller, and because the memory controller returns requested data as soon as its query processing is complete. In a simplified case, the host can request return of raw metadata (e.g., all data or data of a specific type for a specified address). For asynchronous queries or functions, the host typically provides a parameter (such as a mode setting and/or a host-selected threshold of some type) and the memory controller then operates a continuous or intermittent process to check for the specified condition; when the condition occurs, the memory controller immediately alerts the host, typically providing information that triggered the alert (such as EU and/or page identity and metadata for the EU pertinent to the function being tracked). That is, if the condition does not occur, there is no responsive alert sent to the host, and the condition is monitored for occurrence at any time in the indeterminate future. As should also be apparent, sophisticated queries can be run that involve multiple metadata parameters. For example, a host might request an alert any time a partially written EU simultaneously reaches a specific page utilization threshold (e.g., less than 50% utilization) and has a time since last data access greater than a second threshold. Many examples of asynchronous processes are possible and will no doubt occur to the skilled memory architect. Once again, any suitable thresholds or modes are stored in registers 619.

A media icon 621 is depicted to indicate the use of software or firmware by the memory controller. The memory operations and query/management logic blocks 613 and 617 and registers 619 are all depicted within a dashed-line box 623 denoting that, in one implementation, these elements can optionally reside on a single die (e.g., a single processor or coprocessor); in such an embodiment, the media icon 621 typically denotes the use of firmware, for example, stored in memory within the single die in question. In this regard, such firmware can be designed to respond to vendor-specific NVMe extensions to implement specific query/management functions. For example, any desired asynchronous query can be implemented as a function call supported by firmware; when the asynchronous command in question is triggered, it is run as an open process in the die (623) or a coprocessor dedicated to the query/management functions. Alternatively, many processors can be provided, each assigned queries/ asynchronous processes as they are invoked. As implied earlier, a specific asynchronous process can be associated with a mode set by the host; for example, in one mode defined by the host, the memory controller can automatically alert the host any time it identifies a space reclamation (garbage collection) candidate, based on default or host-identified parameters—in a second mode, this function is turned "off." Note that in the future, newer versions of standards such as NVMe can be structured so as to inherently support generic commands calls consistent with the operations discussed above.

The metadata storage 611 is indicated as separate from dashed-line box 626, reflecting that the metadata storage optionally can exist independent of the processing logic, e.g., on a separate die. That is, in one embodiment, the metadata storage consists of nonvolatile memory, such that it is persistent in through power cycling. In another embodiment, the metadata storage can exist in SRAM (e.g., internal to optional die 323), with data switched to nonvolatile memory and loaded back again in response to power cycling. In still another embodiment, as denoted by optional connection block 625, the metadata storage can be read directly by the host, i.e., via a form of commands for direct memory access. In such an embodiment, the host simply reads a special memory location which it knows will contain metadata for a specific EU or EU range, or for the flash memory as a whole.

Once again, while illustrated in the context of a flash memory controller, cooperative functions and supporting logic and infrastructure can also be applied to other memory controller designs, particularly for NV memory types.

Figure 6B:
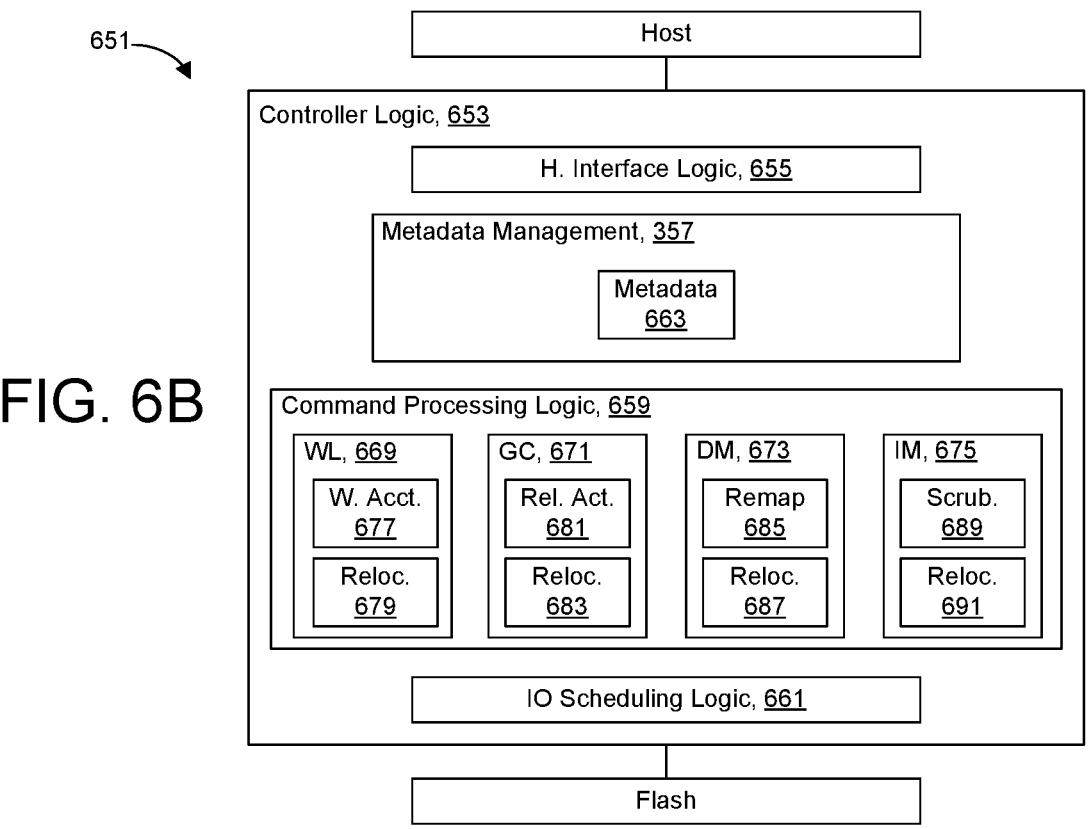
FIG. 6B is a block diagram of another memory controller.

FIG. 6B shows a block diagram of another cooperative memory controller 651; more particularly, FIG. 6B is used to show how logic functions can be implemented using hardware and firmware logic 653. This logic 653 supports a number of optional processing features. In one embodiment, this memory controller uses this logic to perform many traditional flash controller functions (e.g., management of an FTL and associated search trees). This is to say, while one advantage of the memory controller 651 is the substantial reduction or omission of an FTL layer, this is not required for all embodiments as noted earlier. In another embodiment, the memory controller implements comprehensive cooperative functions that help reduce the need for complex FTL processes, as referenced above.

For the embodiment of FIG. 6B, logic 653 is seen to have a number of basic function blocks, including interface logic 655 to interact with the host using packetized commands and responses, logic 657 used for local metadata management, command processing logic 659 used for query processing and other management functions, and IO scheduling logic 661 used to manage memory transactions (e.g., program and erase operations). As noted, even in an embodiment where it is desired to substantially reduce the FTL layer, a memory controller can still optionally implement some address translation, for example, for defect remapping as well as other functions. The metadata management logic 657 maintains locally-stored information in the form of metadata 663, as mentioned, for each unit of memory of the memory device. Non-limiting examples of information that can be tracked are once again discussed below in connection with FIG. 6. This information can include L2P or P2L mappings for each memory unit; that is, as discussed below, even for an embodiment where the host uses direct physical addressing, a scheme of shared address assignment responsibility can be implemented, with the memory controller assigning physical addresses based on an initial logical address specified by the host, with the memory controller reporting back assigned physical address(es) to the host, for the host to build a L2P table for future reads to the data. This shared addressing scheme can also optionally be employed for certain other delegated functions, e.g., valid data relocation, unit erase, garbage collection, defect management and other functions. Note that this is not required for all embodiments, i.e., as will be detailed below, a host can also support these functions and dictate physical addresses for new writes. In many embodiments described below, an adaptable memory controller architecture will be described, providing implementation flexibility in assigning specific tasks to either host or memory controller. To these ends, the metadata management logic can include structure to assign physical address and generate updates to stored metadata 663 and to report back to the host an index of physical locations assigned the newly-written file for situations where address assignment is to be performed by the memory controller.

To provide another example of use of a limited address translation scheme notwithstanding address directed by the host, as previously introduced, a memory controller can be configured to identify write error and to transparently remap the subject data over to reserved memory space. Because such reassignment might affect only a very small portion of data written to memory, the memory controller can advantageously keep track of this reassignment using the metadata 663. Future reads specifying the remapped EU are intercepted by the memory controller logic using locally-stored metadata 663 and redirected to the proper physical location in memory for defective blocks. In this manner, the memory controller is freed from having to implement extensive search trees to find physical locations based on supplied logical addresses, i.e., the memory controller need only track defective memory reassignments, which ultimately become stale as the memory controller progresses through erase operations, garbage collection and updates of data (the latter being directly written to new pages or EUs). Note that such addressing can be made even simpler if memory controller simply allocates remapped space to a reserved EU using a like page assignment.

The command processing logic 659 receives commands from the host directed to general configuration of memory operations and for queries. Generally speaking, this logic manages and updates the metadata 663 and runs queries on the metadata, returning information to the host as appropriate via the host interface logic 655. The returns to the host can be immediate returns to synchronous commands and immediate or later responses (or alerts) to asynchronous commands. Exemplifying some command options, the command logic can (a) serve information up to the host drawn from metadata 663 for use in wear aware writes, and (b) assist with wear leveling (WL), garbage collection (GC), defect management (DM) and integrity management (IM) functions in memory. Note that in network storage applications with multiple drives, this further enables certain novel host capabilities, as will be described in the section dealing with an exemplary storage system further below. Note also that in some embodiments the host can also directly access raw metadata, e.g., as a form of direct memory access.

An exemplary memory controller can assume varying levels of host support in a manner that can be customized to any specific memory system design. That is, memory controller 651 optionally possesses dedicated logic infrastructure to perform WL, GC, DM and IM specific functions (669, 671, 673 and 675, respectively), each of which can be configured/tailored to a specific level of interaction with the host pertinent to the specific implementation. Depending on the desired level of interaction, the memory controller 651 helps avoid the need for remote storage and retrieval of large address translation tables and the use of complex search trees, e.g., address translation can be performed using a greatly simplified address translation table or omitted in the memory controller entirely. In addition, the configured level of cooperation can advantageously permit a host to directly assume scheduling of many flash management functions that might interfere with (i.e., compete with) host-directed writes, such as garbage collection, data relocation, wear leveling and so forth. That is to say, an architecture will be described below that permits a memory controller to serve sophisticated information to the host to assist with this scheduling. This, combined with less FTL overhead, provides for faster, more consistent flash response, and facilitates multiple drive storage aggregates based on solid state (flash) drives (SSDs) as well as mixed or heterogeneous systems that combine SSDs with other memory types.

Note that this is an example only, e.g., the architecture described herein can optionally also support a traditional FTL design, or memory controller management of complex functions.

To assist with host scheduling of flash management tasks, the memory controller can have firmware or hardware logic (or both) dedicated to specific types of host commands and host queries. In the embodiment of FIG. 6B, this structure is illustrated as optionally including structure to assist with wear leveling (WL), garbage collection (GC), defect management (DM) and integrity management (IM) functions, but other functions or logic can also or instead be used. To support these functions, the memory controller uses command processing logic 659 to manage space allocation and space reclamation, and otherwise to service host calls for the return of management data. For example, this command processing logic can facilitate direct physical addressing by identifying for the host available (i.e., available, erased) address space, candidates for erase (released space), candidates for data relocation and garbage collection (e.g., based on low page utilization), assistance with cold data location (e.g., wear leveling), or more general functions.

For both embodiments that use wear-aware writes as well as those that do not, the memory controller can include wear leveling logic 669. That is, to account for a limited number of flash memory P/E cycles (typically on the order of tens to hundreds of thousands of cycles for NAND flash), the logic on board the memory controller can be designed to track wear as part of metadata 663 and to provide this information to the host. If over time, certain units of memory are determined to represent disproportionately high or low wear relative to overall memory, wear leveling can then be performed. Note that for embodiments where wear-aware writes are used, wear leveling can be highly localized, i.e., performed as a data relocation option simply to redistribute cold data. The memory controller 651 can generate alerts when predetermined wear thresholds are reached, and can otherwise perform low level queries relating to wear leveling. In support of the techniques presented by this disclosure, the wear accounting logic 677 can keep a changing-list of EUs, ranked in order of coldest data, least wear, greatest wear or in another manner. In one embodiment, this logic can be prompted via an explicit host command to synchronously compile such a list or to asynchronously notify the host of EU identity any time a wear metric (e.g., EU erase count) exceeds a programmably-defined value. Then, when and as wear leveling is scheduled by the host, the host issues a command to the memory controller to relocate cold data and erase the old space (e.g., using relocation logic 679), thereby redistributing that space into a pool of available space used for active writes (and potentially more frequently-cycled data). Note that in an embodiment where the host directly addresses physical space and performs wear-aware address assignment, distribution of wear can be inherently minimized as part of the write process. However, disproportionate wear can still occur for data that is held for a long time and which is therefore deemed "cold;" that is, cold data can keep EUs out of circulation while other EUs are more frequently recycled. The memory controller architecture presented by this disclosure supports memory controller cooperation with wear management through the use of "limited" data relocation and wear leveling processes (e.g., directed only to specific address ranges within flash) as well as (if pertinent to the implementation), the scheduling and management of more extensive wear leveling, e.g., for entire flash devices or across multiple flash devices or drives.

As alluded to earlier, a copy-on-write process can result in retaining old pages in flash memory that are stale. This is because a given EU can have other pages that are still in use, and the old page location typically cannot be reused until the entire associated EU is recycled. Over time, substantial portions of flash memory can be locked up simply because a small fraction of space in many respective EUs is still in use. This situation can occur whether the host or the memory controller performs address translation. To address this, the memory controller of FIG. 6B therefore uses garbage collection logic 671 to assist with functions of periodically consolidating data. That is, the garbage collection logic can track information pertinent to whether an EU is mostly stale or is still efficiently being used and can process host queries relating to this information. One form of this tracked information is page utilization information, e.g., where the memory controller stores information indicating whether each page in a given EU is available (erased but not yet written), has valid data (cannot be written to without an erase), or is released (a page with stale data that cannot be rewritten until it is first erased). Garbage collection involves accounting for released pages, for example, using release accounting logic 681 to track the mentioned page utilization information for each page (or other logical unit) for each EU; EUs with relatively few used pages can have those pages consolidated with pages from other EUs having similarly low page utilization, with the then-concentrated valid date being rewritten to a new destination. In an embodiment where the memory controller tracks this information, the memory controller can compute an extent of page utilization (e.g., 10% valid data) and can provide this information to a host with EU identity to permit the host to decide which EUs should have data consolidated and moved. The host can then schedule any resultant operation in a manner that does not compete for needed read data elsewhere in the subject memory. Note that "page utilization" as used herein generally refers to the extent to which pages of a given EU are valid (in use) or are stale or not in use. For example, if most pages in a given EU were stale or unused and only a few pages of the EU had valid data, the extent of page utilization in the given EU would be low. Conversely, if most pages in an EU were in active use, the extent of page utilization for the given EU would be high.

In an embodiment where the host cooperates with the garbage collection task, the host can query the memory controller using a command, with processing of the command performed in cooperation with the release accounting logic 681. In more detailed embodiments, the release accounting logic can be designed to perform low level inquiries, for example, to return a list of EUs where page utilization falls below a specific threshold (e.g., 50%). Such a list can be further prioritized, for example, in terms of EU wear, persistence, age or hot-cold status of any remaining valid data, and so forth. Such a prioritization or other sorting or indexing function can also be managed as an asynchronous task, e.g., the host can request that the memory controller alert the host if at any time an EU that has been written-to (or that has just had a page released) experiences less than a threshold level of page utilization; in this regard, the release accounting logic 681 tracks explicit page release with each command information update, and can perform any processing necessary to alert the host in response to any asynchronous queries. The release accounting logic 681 also has circuitry and/or firmware that performs other forms of processing, for example, optionally providing a list of "the 10 best" candidates for garbage collection in the desired order. In another embodiment, some or all of the data relocation functions can be managed by the memory controller, for example, with relocation logic 683 being delegated specific tasks by the host (such as the identification of EUs to the host for relocation of data, or relocation of data in response to a host-specified "available" target memory address within the same tier, selected according to wear). Once relocation has been performed, with respective L2P mappings updated and associated physical pages are released, the full EU which has just been fully released is reclaimable. In one embodiment, this is performed by the host, which issues an explicit EraseBlock command for an address-specified EU—logic 655 processes this command and, once the command is completed, returns the freed EU to a pool of available EUs for future data allocation.

Write and erase errors discovered by the flash memory controller are handled by defect management flash management logic 673. Pages found defective due to write error are remapped by defect remapping logic 685, with write operation retried transparent to the host. The original page in error is marked defective or "bad" and added to a bad block list or map to avoid further use of associated physical pages. Unit relocation logic 687 performs background relocation of data that experienced write error to minimize possibility of further write errors. Unit erase errors are handled by the defect management logic as well, with defective EUs also reflected on a bad block list kept by the flash memory controller. As indicated, in such a scheme, the entire EU can optionally be moved, preserving relative page layout and simplifying translation issues.

While flash memory typically provides strong error detection and correction (EDC), the memory controller may also provide onboard data integrity management logic 675. Data scrubbing logic 689 is responsible for background data integrity checks based on EDC or additional data integrity metadata. Suspect blocks with transient errors identified are relocated by suspect relocation logic 691 using mechanisms similar to wear leveling and garbage-collection relocation processes described above.

As operations are performed in memory, whether as part of a management operation (such as data relocation) or in servicing a write or read command, IO scheduling logic 661 detects completion of the command. Pertinent information is added by metadata management logic 657 to the stored metadata 663 for the pertinent EU, and the host is then signaled with any completion codes as necessary. For example, if a data relocation operation has been performed, the metadata 663 can be updated with new information for both source and target blocks of memory (e.g., new page release information, L2P and P2L mapping, wear information and so forth), and the host can be signaled with new physical addresses for relocated valid data.

Note that, depending on embodiment, the flash memory controller can support one or more of the functions or units of logic described above, i.e., a memory controller can include subsets of the described logic to assist in the performance of specific tasks. For example, one hypothetical memory controller could omit the data relocation logic 683 if the host was to perform this function. Also, other logic functions can also be supported or provided for beyond those discussed. As mentioned, the embodiment of FIG. 6B presents a single memory controller architecture adaptable to multiple, different implementations, but this is not required for all embodiments.

Clearly, many examples exist for the layout of a cooperative memory controller. In various embodiments, these layouts can support different cooperative functions.

FIGS. 7-10 will be used to provide additional detail on how such exemplary, cooperative structures can be used to assist with some of the data migration processes referenced earlier. For example, as noted, the memory controller can be designed to alert a host when its managed memory tier exceeds a specific management threshold, for example, that calls for garbage collection (e.g., insufficient free, erased space is on hand, or memory utilization falls below a threshold) or wear leveling (e.g., wear is disparate). When configured to execute in the cooperative flash management mode for any one or more of the areas mentioned above, a cooperative memory controller provides methods and mechanisms for a host (e.g., host software) to define and detect the management condition, to query metadata in connection with that condition, and to electively take responsive action.

Figure 7:
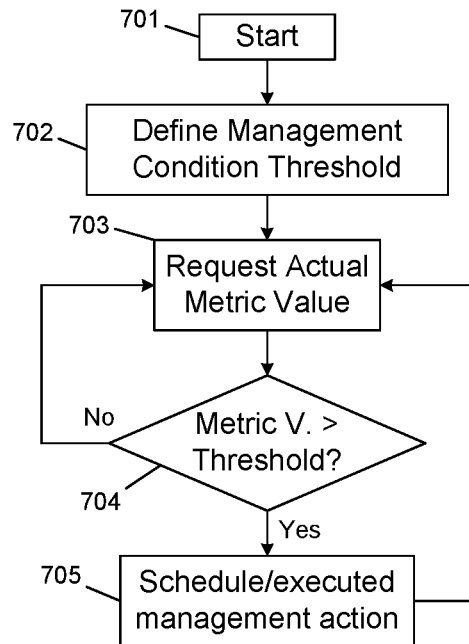
FIG. 7 is a flow diagram that illustrates tasks in a cooperative memory management scheme.

FIG. 7 illustrates a process of the host-controller interaction in management condition detection. The process starts at step 701. At step 702, either of the host or the memory controller determines a need to assess the management condition, for example, as a function of running a routine or based on some type of trigger. For example, in one embodiment, the host can initiate a process such as periodic wear leveling (either via explicit command or as a result of setting an asynchronous process in the memory controller). The memory controller can also be set for a default operation, e.g., automatically alerting the host or providing data unsolicitedly to the host any time all pages have been released for a given EU; such a process can be triggered by the memory controller, which notifies the host of a need for intervention or simply (unsolicitedly) provides pertinent information to the host. Such a notification can also be the result of an asynchronous process or mode selectively set by the host, as mentioned above. Many other examples also exist. In one such example, a particular implementation may call for specifically alerting the host "automatically" any time a page release is determined to be the last page release for an EU (e.g., the EU is completely released) or when insufficient available (assignable) free space remains; in different implementation, this information might always be tracked by the host (or not tracked at all). Irrespective of how the process is initiated, at step 703, the memory controller provides data to the host based on tracked, subdivision-specific (e.g., EU-specific) information associated with a particular parameter or metric. In one embodiment, each exchange between memory controller and host can be performed in a manner compliant with NVMe, for example, using a vendor-specific extension or a vendor specific NVMe administrative command. At step 704, host software checks the value returned at step 703 against a specified threshold to determine existence of a condition requiring intervention. On a negative determination, the process ends or otherwise loops to step 703 after a suitable delay. On a positive determination, host software proceeds to take management action (step 705). Once management action completes, the process either concludes or is looped back to step 702.

As an example of management action, a host can initiate data migration followed by an explicit erase operation that specifies an EU physical address in the given memory tier. Because such an operation is host-initiated, it does not collide with a host-issued read or write request to that tier, thereby improving system performance. In a multiple drive system, the host can hide an explicit erase (and garbage collection and other functions) behind a read or write request to another system drive. For example, in a configuration where multiple drives are coupled to a host through (e.g., through a multidrop connection, a bridge or other routing scheme), commands from the host can be interleaved such that as read and write operations are performed in one drive, garbage collection and unit erase tasks are performed in another. In a system which has multiple SSDs, this parallel processing ability can lead to further performance benefits. Note that this type of parallel processing can also be performed where drives are connected point-to-point with a host.

Figure 8:
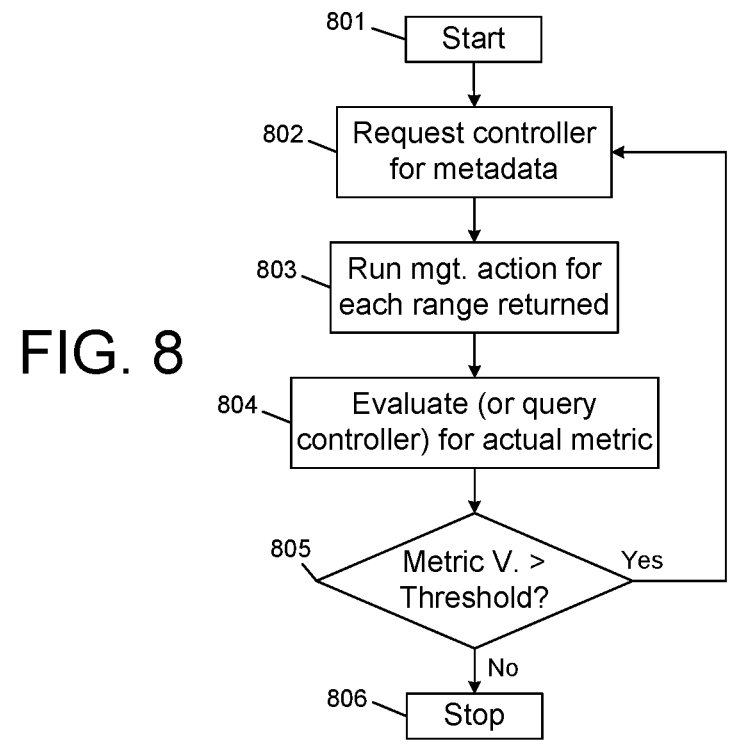
FIG. 8 is a flow diagram that illustrates host tasks in a cooperative memory management scheme.

FIG. 8 shows a method for host software to query metadata pertaining to pending management tasks; the host software can then determine the existence of a condition and optionally execute the decision it deems appropriate. The process starts at step 801. At step 802, host software—either in response to the management condition being detected with one of the methods described above or at will—requests the controller for metadata. For example, the requested information can be in the form of a map that verbatim passes tracked metadata to the host, for example, by providing per-data metrics (i.e., for valid data stored in an EU or page) or wear data back to the host; other information such as page utilization and page release status can also be reported if desired. At step 803, for each metadata range returned, host software performs any processing appropriate on returned metadata including, for example, initiating a data migration operation. At step 804, if management action is to be performed in response to the management condition being detected, host software either evaluates a current metric based on actions performed or queries the controller for a value. Based on the value obtained, at step 805 the host software checks if the condition still holds and if more metadata needs to be requested. On a positive determination, the process loops to step 802 where additional metadata is requested. If the determination is negative, the process concludes (step 806).

As mentioned, the cooperative memory controller of this disclosure can track many different types of information representing subdivision-specific-usage. This tracking information can be in the form of metadata 900 that represents one or more parameters, illustrated in FIG. 9. A first tracked parameter represents unit state 905; in the case of an EU, this field can be used to store data indicated whether the EU is bad. Alternatively, this field can also be used to denote whether the EU contains valid host data, or is otherwise available for allocation to the host or to the controller. Status 910 can be used to track any active controller operation. A wear field 915 keeps track of wear information for the pertinent storage unit (e.g., for the EU) for example, by storing the number of erase operations performed upon that particular unit (e.g., EU) to date. An age field 920 keeps track of how long it has been since data was written to the erase unit. Time in this context can be represented in many different equivalent manners, for example, based on a time stamp or any other desired numerical value or other metric. Read count 925 identifies how many reads have been performed for data stored in the unit (e.g. EU) since the last erasure, or alternatively stores other hot/cold information, e.g., for a logical page of data stored in a particular physical page. In one embodiment, time since last read can be computed from the erase or another metric, e.g., with those memory controller or host calculating time relative to other EUs or metrics, tracked either by the memory controller or the host. Address 930 keeps track of a logical address associated with the erase unit. Release Count 935 identifies number of pages within the particular unit (e.g., EU) that have been released. The bitmap field 940 lists or otherwise identifies pages within the erase unit that are free (i.e., available for writes), valid (with actively-used data), or released. Depending on embodiment, this type of data can be maintained in a variety of ways; for example, more than one field can be used to track each of these parameters, or release status can be inferred from valid data status, or vice versa. Other alternatives are also possible. The bitmap field can also be used to indicate whether the pages in the particular EU were written out-of-order. The remapped flag field 945 indicates whether the EU has been allocated to defect management. Field 950 can also be used to store other parameter, as desired, whether tracked per-data (e.g., per page of logical data stored in the corresponding memory location) or per physical memory location (page or EU). As noted earlier, in another embodiment, the above metadata could instead be tracked on the basis of logical unit with a mapping to the physical erase unit.

FIG. 9 should be understood as providing non-limiting examples only, that is, not all of the listed data must be maintained by a memory controller, and each identified field should be viewed as optional. Similarly, there are also many other types of data, beyond those specifically illustrated in FIG. 9, which can be used.

Generally speaking, cooperative management tasks can be grouped according to three primary categories: Defect Management, Wear Leveling Management, and Garbage Collection Management. The cooperative memory controller-host interaction described in this section provides a unique ways of handling these management functions in a way that can be customized to the specific implementation, that is, to assist with the data migration methods introduced earlier. That is, a single memory controller design can support a number of configurable options (or modes) for allocating responsibility for tasks. Prior to discussing these options, however, it would first be helpful to revisit some of the capabilities provided by the structure described above. Once again, in one embodiment, information can be tracked by the memory controller and made accessible to the host in a manner that helps reduce reliance on a memory controller to maintain detailed address translation tables. That is, for purposes of the discussion below, it should be assumed as a default that (1) the host maintains a reasonably-accurate understanding of physical location of data in flash memory and is thus capable of directly addressing data to the specific physical locations in memory at which the data will be stored, and (2) many of the operations which might traditionally compete with host read/write requests will instead be managed by the host, i.e., such that tasks are schedule so that there is no competition.

As discussed above, the host can issue commands to the memory controller requesting a listing of space according to desired criteria, for example, as referenced in FIG. 2B. That is, while in one embodiment, the host can track these things, in another embodiment, the memory controller can be delegated certain prioritization functions and the host can at any time simply request an update or listing of specific space or conditions by explicit command to the memory controller. The host can rely on this information for a period of time (e.g., until its list of available space grows low) and the host can then schedule garbage collection, wear leveling, erase operations and data migration operations at a time convenient to the host.

FIG. 10 shows a general method 1001 used to illustrate this interaction. Note that invocation of the method can be triggered by the need for an application or an operating system to write data to memory, per numeral 1005, e.g., a cache eviction as referenced earlier. The host is responsible for having a list on-hand with available free space for memory tiers that will receive write data; this list can be periodically updated by the host by query to the memory controller, e.g., after an erase operation is performed. Note that a steps associated with such a query are illustrated in phantom-line boxes in FIG. 10, i.e., are designated by function blocks 1007, 1009 and 1013. That is, optionally in connection with an erase operation, the host requests the memory controller to identify all free space, sorted or prioritized in order of least wear; this listing is determined by reference to the memory controller's metadata repository 1011. In a system having multiple SSDs, the host can maintain a dedicated table for each SSD or, alternatively, it can instead build a table spanning memory space for multiple SSDs using sorted information from each SSD. "Available space" or "free space" in this context refers to space that has previously been erased in flash memory but has not yet been written to, meaning it is available for immediate programming (i.e., writes). Per numeral 1015, the host then chooses a write address for data based on the list. Note that other priority schemes besides those listed above can also be used; as a non-limiting example, space can also be assigned for writes based on wear-to date, as referenced earlier. Such a list can also be prioritized by other criteria, tracked or otherwise. After selecting a suitable destination address, the host then issues a write command to the memory controller specifying a desired physical address within flash memory, per numeral 1017. As indicated by function block 1019, the memory controller then manages the write process and, once successful, returns a code to the host confirming a successful write. The memory controller also updates the metadata repository (1011) stored for each pertinent EU (e.g., to indicate that the assigned space is now taken, and to update any other tracked parameters regarding the data or use of the particular memory space). As reinforced by function block 1021, the host then updates its own translation tables (1023) as appropriate, i.e., with little to no L2P translation performed by the memory controller. In one embodiment to be discussed below, in which a memory controller is to perform its own defect management, the memory controller can remap data and mark the intended physical address as "bad" without immediately reporting this information to the host—advantageously, L2P translation is restricted to few, notable situations such as this. For a NVMe compatible implementation, these processes can once again be implemented with a vendor specific command. For example, the host can issue a command requesting LUN ranges and the amount of space that the host software is considering to allocate. Upon successful completion, the command returns a list of erase unit size logical block address ranges, prioritized by wear, and described by (LUN, offset) pair or single offset value (if the LUN was specified in the host request). A returned command status code can further specify whether the requested amount of space was available, whether the request was satisfied or whether further calls are required. The host then directs its writes as appropriate, directly specifying addresses for pertinent memory operations.

Note that writes targeted in the manner indicated above will inherently tend to level wear in flash memory, thereby reducing the need for wear leveling relative to some conventional schemes. As further noted below, even with such a scheme, asymmetric wear is possible and, therefore, cold data detection and consequent data relocation is advantageously performed even where wear-aware programming is performed, i.e., to perform "limited" wear leveling as described above. Also note that because the host has or is provided with direct physical addresses of free space, there is no need (or greatly reduced need) for L2P address translation at the memory controller.

The description presented above provides examples of storage system architectures, data migration methods and various related memory management techniques. As indicated, these techniques can optionally be employed with any one or more of these components. Further, in the system context, certain functions have been exemplified as being performed by a memory controller or host, but may be performed by the other depending on implementation, or by plural memory controllers. While certain tiers of memory (e.g., SSDs, DRAM, HDDs, etc.) have been described as generally having their own, dedicated controllers, it is possible to have multiple types of memory managed by a single controller, i.e., with a drive or memory itself constituting a hybrid. Further, while some embodiments have been described having two tiers of memory, but it is possible to have a single tier of memory (e.g., all NAND-flash), or three or more tiers of memory, as appropriate to the particular method and application. Some embodiments may omit one or more of these in favor of other memory types, for example, the HDDs can be omitted, or a different type of storage media can be used.

It should be noted that the subject matter disclosed herein can be expressed (or represented), as data and/or instructions embodied in various computer-readable storage media, meaning physical non-transitory media such as computer memory, storage disks and the like. In this context, the described subject matter can take the form of instructions or data for fabricating an integrated circuit (or integrated circuits) that, when built and operated, possesses the circuits and structures, and performs the techniques described herein. An output of a process for designing an integrated circuit, or a portion of an integrated circuit, comprising one or more of the circuits described herein may be such a computer-readable medium such as, for example, a magnetic tape or an optical or magnetic disk, or other non-volatile physical storage. The computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein. Some or all of the functions described above can also be embodied as instructions stored on machine-readable media, including software code or firmware that, when executed, cause a machine (e.g. a microprocessor or device having a microprocessor) to perform the described functions. Generally speaking, any such instructions can be alternatively implemented as hardware logic, or a combination of hardware and software logic, depending on implementation.

The foregoing description and in the accompanying drawings, specific terminology and drawing symbols have been set forth to provide a thorough understanding of the disclosed embodiments. In some instances, the terminology and symbols may imply specific details that are not required to practice those embodiments. The terms "exemplary" and "embodiment" are used to express an example, not a preference or requirement.

Various modifications and changes may be made to the embodiments presented herein without departing from the broader spirit and scope of the disclosure. For example, in some embodiments, "hot/cold" values have been given as examples of per-data tracked metrics. This term can have multiple meanings depending on embodiment. In one embodiment, the hot/cold nature of data refers to expected write frequency or data persistence, e.g., whether data is expected to be persistent (and therefore can be written to a worn memory location under the presumption that this location will not be released for a while, permitting less worn memory locations to "catch up" in terms of wear). Data age, referred to for some embodiments, refers to much the same concept, e.g., an age-since-write can be tracked (or a similar metric) permitting an inference that data is expected to be persistent (and therefore can be written to a worn memory location under the presumption that this location will not be released for a while, permitting less worn memory locations to "catch up" in terms of wear). As noted earlier, many other metrics or values can be tracked or generated for respective data, e.g., as noted, some embodiment track read frequency as a measure of hot/cold data usage, for purposes of levelizing traffic to parallel elements within a tier of memory. These are not the only types of metrics that can be generated or tracked for respective data.

Features or aspects of any of the embodiments may be applied, at least where practicable, in combination with any other of the embodiments or in place of counterpart features or aspects thereof. Accordingly, the features of the various embodiments are not intended to be exclusive relative to one another, and the specification and drawings are to be regarded in an illustrative rather than a restrictive sense.

We claim:

1. A storage apparatus comprising:
   at least one host processor; and
   one or more storage drives, including a given storage drive having planes of flash memory, storage subdivi-

43 sions each being respectively mapped to mutually-exclusive sets of erase units of the given storage drive, a given one of the storage subdivisions being mapped to erase units in respective ones of the planes of flash memory;

wherein the given storage drive further comprises circuitry operable to transmit, to the at least one host processor, information representing size and logical address information for the given one of the storage subdivisions;

wherein the at least one host processor is operable to transmit, to the given storage drive, one or more commands logically addressed to the given one of the storage subdivisions; and wherein the given storage drive is operable to, responsive to the one or more commands, erase the mutually-exclusive set of erase units mapped to the given one of the storage subdivisions, including erase units in at least two different ones of the planes.

2. The storage apparatus of claim 1, wherein the given storage drive is operable to:

receive write commands addressed to the given one of the storage subdivisions and to responsively write associated data into a different set of one or more erase units of the given storage drive, the different set being freely mappable to any of the storage subdivisions of the given storage drive, the different set being mutually-exclusive to erase units mapped to each of the storage subdivisions other than the given one of the storage subdivisions; and map the different set to the given one of the storage subdivisions.

3. The storage apparatus of claim 1, wherein the one or more commands comprise at least one command to overwrite a logical address with data, and wherein the given storage drive is operable to track metadata representing utilization of the erase units in the mutually-exclusive set which the given one of the storage subdivisions is mapped to and, responsive to the at least one command, deallocate a physical storage location to which the logical address was previously mapped and, in association with the deallocation, automatically erase at least one erase unit of the mutually-exclusive set of erase units mapped to the given one of the storage subdivisions.

4. The storage apparatus of claim 1, wherein the one or more commands comprise at least one deallocate command, and wherein the given storage drive is operable to, in association with the deallocation, automatically erase at least one erase unit of the mutually-exclusive set of erase units mapped to the given one of the storage subdivisions.

5. The storage apparatus of claim 4, wherein the at least one deallocate command comprises at least one command operable to cause the given storage drive to deallocate an amount of storage space corresponding in size to the size of the given one of the storage subdivisions.

6. The storage apparatus of claim 1, wherein the given storage drive further comprises circuitry operable to:

store metadata respective to the given one of the storage subdivisions;

receive a query from the at least one host processor specifying the given one of the storage subdivisions; and transmit, to the at least one host processor, information dependent on the stored metadata which is respective to the given one of the storage subdivisions.

44

7. The storage apparatus of claim 6, wherein the information transmitted to the at least one host processor indicates an extent to which the given one of the storage subdivisions is full.

8. The storage apparatus of claim 6, wherein the information transmitted to the at least one host processor represents a time since data was written to the one or more erase units.

9. The storage apparatus of claim 1, wherein the size of the specific one of the subdivisions corresponds to a minimum amount of storage capacity to be erased by the given one of the storage drives.

10. The storage apparatus of claim 1, wherein the given storage drive further comprises circuitry operable to:

store metadata respective to the given one of the storage subdivisions; and compare the metadata to at least one criterion and, upon detection that the metadata satisfies the at least one criterion, copy data from one or more erase units in the mutually-exclusive set which is mapped to the given one of the storage subdivisions to a different erase unit, wherein the different erase unit is mutually-exclusive to erase units mapped to each of the storage subdivisions other than the given one of the storage subdivisions.

11. The storage apparatus of claim 1, wherein:

the given storage drive further comprises circuitry operable to cause the given storage drive to store metadata for one or more of the erase units in the mutually-exclusive set which is mapped to the given one of the subdivisions; and the storage apparatus is operable to, in response to the metadata meeting a criterion, move data which is stored in the given one of the subdivisions to at least one of a different storage drive or a different one of the subdivisions.

12. The storage apparatus of claim 1, wherein the at least one host processor is operable to:

track release status information for individual logical block addresses (LBAs) associated with the given one of the storage drives; and issue one or more commands addressed to the given storage drive, as a function of the tracked release status information, wherein the given storage drive is operable to perform at least one maintenance operation in a manner that is directed to the given one of the subdivisions to the exclusion of at least one other of the subdivisions.

13. The storage apparatus of claim 1, wherein the storage apparatus further comprises circuitry to identify one of the mutually-exclusive sets of erase units which is fully released and to responsively control erasure of each erase unit in the one of the mutually-exclusive sets of erase units which is fully released.

14. A storage apparatus comprising:

at least one host processor; and one or more storage drives, including a given storage drive having planes of flash memory, storage subdivisions each being respectively mapped to mutually-exclusive sets of erase units of the given storage drive, each of the storage subdivisions being mapped to erase units in respective ones of the planes of flash memory;

wherein the given storage drive further comprises circuitry to transmit, to the at least one host processor, information representing size and logical address information for a given one of the storage subdivisions;

wherein the at least one host processor is to transmit, to the given storage drive, one or more commands logically addressed to the given one of the storage subdivisions; and wherein the given storage drive is to, responsive to the one or more commands, erase the mutually-exclusive set of erase units mapped to the given one of the storage subdivisions, including erase units in at least two different ones of the planes.

15. The storage apparatus of claim 14, wherein the given storage drive is operable to:

receive write commands addressed to the given one of the storage subdivisions and to responsively write associated data into a different set of one or more erase units of the given storage drive, the different set being freely mappable to any of the storage subdivisions of the given storage drive, the different set being mutually-exclusive to erase units associated with each of the storage subdivisions other than the given one of the storage subdivisions, the different set also including erase units in at least two different ones of the planes; and map the different set to the given one of the storage subdivisions.

16. The storage apparatus of claim 14, wherein the one or more commands comprise at least one command to overwrite a logical address with data, and wherein the given storage drive is operable to track metadata representing utilization of the erase units in the mutually-exclusive set which the given one of the storage subdivisions is mapped to and, responsive to the at least one command, deallocate a physical storage location to which the logical address was previously mapped and, in association with the deallocation, automatically erase at least two erase units of the mutually-exclusive set of erase units mapped to the given one of the storage subdivisions, including at least one erase unit in each of the at least two different ones of the planes.

17. The storage apparatus of claim 14, wherein the one or more commands comprise at least one deallocate command, and wherein the given storage drive is operable to, in association with the deallocation, automatically erase at least two erase units of the mutually-exclusive set of erase units mapped to the given one of the storage subdivisions, including at least one erase unit in each of the at least two different ones of the planes.

18. The storage apparatus of claim 17, wherein the at least one deallocate command comprises at least one command operable to cause the given storage drive to deallocate an amount of storage space corresponding in size to the size of the given one of the storage subdivisions, including storage space corresponding to each of the at least two different ones of the planes.

19. The storage apparatus of claim 14, wherein the given storage drive further comprises circuitry operable to:

store metadata respective to the given one of the storage subdivisions; and compare the metadata to at least one criterion and, upon detection that the metadata satisfies the at least one criterion, copy data from one or more erase units in the mutually-exclusive set which is mapped to the given one of the storage subdivisions to a different erase unit in each of at least two different ones of the planes.

20. The storage apparatus of claim 14, wherein:

the given storage drive further comprises circuitry operable to cause the given storage drive to store metadata for one or more of the erase units in the mutually-exclusive set which is mapped to the given one of the subdivisions; and the storage apparatus is operable to, as a function of the metadata, move data which is stored in the set of erase units mapped to the given one of the subdivisions to at least one of a different storage drive or a different one of the subdivisions, and in association with the different one of the subdivisions, to an erase unit in each of at least two different planes.

21. The storage apparatus of claim 14, wherein the at least one host processor is operable to:

track release status information for individual logical block addresses (LBAs) associated with the given one of the storage drives; and issue one or more commands addressed to the given storage drive, as a function of the tracked release status information, wherein the given storage drive is operable to perform at least one maintenance operation in a manner that is directed to the given one of the subdivisions to the exclusion of at least one other of the subdivisions, the maintenance operation being performed in each of the at least two different ones of the planes.

22. A storage apparatus comprising:

at least one host processor; and storage drives, each storage drive having planes of flash memory, storage subdivisions each respectively mapped to mutually-exclusive sets of erase units of the storage drive, and for which at least one of the storage subdivisions is mapped to erase units in respective ones of the planes of flash memory of the storage drive;

each given one of the storage drives further comprising circuitry to transmit, to the at least one host processor, information representing size and logical address information for each of the storage subdivisions of the given one of the storage drives;

wherein the at least one host processor is to transmit, to each given one of the storage drives, one or more commands logically addressed to a selected storage subdivision of the at least one storage subdivision for the given one of the storage drives, and wherein the given one of the storage drives is to, responsive to the one or more commands, erase the mutually-exclusive set of erase units which are mapped to the selected subdivision for the given one of the storage drives, including erase units in at least two different ones of the planes of the given one of the storage drives.

23. The storage apparatus of claim 22, wherein each particular one of the storage drives further comprises circuitry operable to:

store metadata respective to a given one of the storage subdivisions of the particular one of the storage drives;

receive a query from the at least one host processor that specifies the given one of the storage subdivisions for the particular one of the storage drives; and transmit, to the at least one host processor, information dependent on the stored metadata which is respective to the given one of the storage subdivisions of the particular one of the storage drives.

24. The storage apparatus of claim 23, wherein the information transmitted to the at least one host processor indicates an extent to which the given one of the storage subdivisions of the particular one of the storage drives is full.

25. The storage apparatus of claim 23, wherein the information transmitted to the at least one host processor represents a time since data was written to the given one of the storage subdivisions of the particular one of the storage drives.

26. The storage apparatus of claim 22, wherein for each particular one of the storage drives, the size of the specific one of the subdivisions corresponds to a minimum amount of storage capacity to be erased by the particular one of the storage drives.

* * * * *